(12) United States Patent
Bell

(10) Patent No.: US 9,106,078 B2
(45) Date of Patent: Aug. 11, 2015

(54) CASCADE ADAPTIVE REGULATOR TAP MANAGER METHOD AND SYSTEM

(71) Applicant: Utilidata, Inc., Providence, RI (US)

(72) Inventor: David Gordon Bell, Spokane, WA (US)

(73) Assignee: UTILIDATA, INC., Providence, RI (US)

( * ) Notice: Subject to any disclaimer, the term of this patent is extended or adjusted under 35 U.S.C. 154(b) by 129 days.

(21) Appl. No.: 14/106,545

(22) Filed: Dec. 13, 2013

(65) Prior Publication Data

US 2014/0222226 A1   Aug. 7, 2014

Related U.S. Application Data

(63) Continuation of application No. PCT/US2013/030961, filed on Mar. 13, 2013.

(60) Provisional application No. 61/761,180, filed on Feb. 5, 2013.

(51) Int. Cl.
*G06F 19/00* (2011.01)
*H02J 4/00* (2006.01)

(52) U.S. Cl.
CPC .......................................... *H02J 4/00* (2013.01)

(58) Field of Classification Search
USPC ................. 700/298, 299, 291, 286; 702/300; 323/301
See application file for complete search history.

(56) References Cited

U.S. PATENT DOCUMENTS

| | | | | |
|---|---|---|---|---|
| 6,958,922 | B2 * | 10/2005 | Kazem | 363/26 |
| 8,275,487 | B2 * | 9/2012 | Schweitzer et al. | 700/286 |
| 8,437,883 | B2 | 5/2013 | Powell et al. | |
| 8,577,510 | B2 | 11/2013 | Powell et al. | |
| 2006/0195229 | A1 * | 8/2006 | Bell et al. | 700/286 |
| 2010/0090674 | A1 | 4/2010 | Bell | |
| 2011/0035077 | A1 | 2/2011 | Lee et al. | |
| 2014/0265574 | A1 | 9/2014 | Tyler et al. | |
| 2014/0277796 | A1 | 9/2014 | Peskin et al. | |
| 2014/0277813 | A1 | 9/2014 | Powell et al. | |
| 2014/0277814 | A1 | 9/2014 | Hall et al. | |
| 2014/0312693 | A2 | 10/2014 | Powell et al. | |

OTHER PUBLICATIONS

International Search Report and Written Opinion for PCT/US2013/030961 mailed May 24, 2013.
International Preliminary Report on Patentability for PCT/US2013/030961 mailed Feb. 9, 2015.

* cited by examiner

*Primary Examiner* — Kidest Bahta
(74) *Attorney, Agent, or Firm* — Foley & Lardner LLP; Christopher J. McKenna; Chethan K. Srinivasa

(57) ABSTRACT

A method is disclosed of controlling the operation of a system for providing electrical power to one or more electrical devices, the system comprising an adjustable power source root node and a plurality of adjustable power source remote nodes located remotely from the root node.

62 Claims, 16 Drawing Sheets

| Master Prior State \ Slave Prior State | Definite Raise | Approach Raise | Dead Zone Bottom | Dead Zone Top | Approach Lower | Definite Lower |
|---|---|---|---|---|---|---|
| Definite Raise | Assert Master Raise / Clear Master State / Negate Slave Raise / Clear Slave State | Assert Master Raise / Clear Master State | Assert Master Raise / Clear Master State | Assert Master Raise / Clear Master State | Assert Master Raise / Clear Master State | Assert Master Raise / Clear Master State / Assert Slave Lower / Clear Slave State |
| Approach Raise | Assert Master Raise / Clear Master State / Negate Slave Raise / Clear Slave State | Maintain Integrator States for Both Master/Slave | Maintain Master Raise Integrator | Maintain Master Raise Integrator | Maintain Integrator States for Both Master/Slave | Assert Master Raise / Clear Master State / Assert Slave Lower / Clear Slave State |
| Bottom half Dead Zone | Assert Slave Raise / Clear Slave State | Maintain Slave Raise Integrator | No Actions | No Actions | Maintain Slave Lower Integrator | Assert Slave Lower / Clear Slave State |
| Top half Dead Zone | Assert Slave Raise / Clear Slave State | Maintain Slave Raise Integrator | No Actions | No Actions | Maintain Slave Lower Integrator | Assert Slave Lower / Clear Slave State |
| Approach Lower | Assert Master Lower / Clear Master State / Assert Slave Raise / Clear Slave State | Maintain Integrator States for Both Master/Slave | Maintain Master Lower Integrator | Maintain Master Lower Integrator | Maintain Integrator States for Both Master/Slave | Assert Master Lower / Clear Master State / Negate Slave Lower / Clear Slave State |
| Definite Lower | Assert Master Lower / Clear Master State / Assert Slave Raise / Clear Slave State | Assert Master Lower / Clear Master State | Preload Slave Raise Integrator | Preload Slave Lower Integrator | Clear Master State | Assert Master Lower / Clear Master State / Negate Slave Lower / Clear Slave State |

Fig. 11

| Net Source Effect | | Forecast Voltage Region | Local Viper Prior State | | | | | |
|---|---|---|---|---|---|---|---|---|
| | | | Definite Raise | Approach Raise | Bottom | Dead Zone Top | Approach Lower | Definite Lower |
| | | $V_{fore} = (V_{tap} + \Delta V_{src})$ | | | | | | |
| Lower | I | $V_{fore} < (V_{set} - \Delta V_{lo})$ | Assert Raise<br>Clear Def & App<br>Clear Raise Int<br>$\Delta V_{load} += \Delta V_{up}$ | Assert Raise<br>Clear App<br>Clear Raise Int<br>$\Delta V_{load} += \Delta V_{up}$ | No Tap<br>No App<br>Preload Raise Int<br>0 | No Tap<br>No App<br>Preload Raise Int<br>0 | No Tap<br>Clear App<br>Clear Lower Int<br>0 | Negate Lower<br>Clear Def & App<br>Clear Lower Int<br>0 |
| Lower | II | $V_{fore} > (V_{set} - \Delta V_{lo})$<br>$V_{fore} < (V_{set} - \Delta V_{dn})$ | Assert Raise<br>Clear Def & App<br>Clear Raise Int<br>$\Delta V_{load} += \Delta V_{up}$ | No Tap<br>Maintain App<br>Maintain Raise Int<br>0 | No Tap<br>No App<br>No Int<br>0 | No Tap<br>No App<br>No Int<br>0 | No Tap<br>Clear App<br>Clear Lower Int<br>0 | Negate Lower<br>Clear Def & App<br>Clear Lower Int<br>0 |
| Indeterminate | III | $V_{fore} > (V_{set} - \Delta V_{dn})$<br>$V_{fore} < V_{set}$ | Negate Raise<br>Clear Def & App<br>Maintain Raise Int<br>0 | No Tap<br>Clear Def & App<br>Maintain Raise Int<br>0 | No Tap<br>No App<br>No Int<br>0 | No Tap<br>No App<br>No Int<br>0 | No Tap<br>Clear Def & App<br>Maintain Lower Int<br>0 | Negate Lower<br>Clear Def & App<br>Maintain Lower Int<br>0 |
| Indeterminate | IV | $V_{fore} > V_{set}$<br>$V_{fore} < (V_{set} + \Delta V_{up})$ | Negate Raise<br>Clear Def & App<br>Maintain Raise Int<br>0 | No Tap<br>Clear Def & App<br>Maintain Raise Int<br>0 | No Tap<br>No App<br>No Int<br>0 | No Tap<br>No App<br>No Int<br>0 | No Tap<br>Clear Def & App<br>Maintain Lower Int<br>0 | Negate Lower<br>Clear Def & App<br>Maintain Lower Int<br>0 |
| Raise | V | $V_{fore} > (V_{set} + \Delta V_{up})$<br>$V_{fore} < (V_{set} + \Delta V_{hi})$ | Negate Raise<br>Clear Def & App<br>Clear Raise Int<br>0 | No Tap<br>Clear App<br>Clear Raise Int<br>0 | No Tap<br>No App<br>No Int<br>0 | No Tap<br>No App<br>No Int<br>0 | No Tap<br>Maintain App<br>Maintain Lower Int<br>0 | Assert Lower<br>Clear Def & App<br>Clear Lower Int<br>$\Delta V_{load} -= \Delta V_{dn}$ |
| Raise | VI | $V_{fore} > (V_{set} + \Delta V_{hi})$ | Negate Raise<br>Clear Def & App<br>Clear Raise Int<br>0 | No Tap<br>Clear App<br>Clear Raise Int<br>0 | No Tap<br>No App<br>Preload Lower Int<br>0 | No Tap<br>No App<br>Preload Lower Int<br>0 | Assert Lower<br>Clear Def & App<br>Clear Lower Int<br>$\Delta V_{load} -= \Delta V_{dn}$ | Assert Lower<br>Clear Def & App<br>Clear Lower Int<br>$\Delta V_{load} -= \Delta V_{dn}$ |

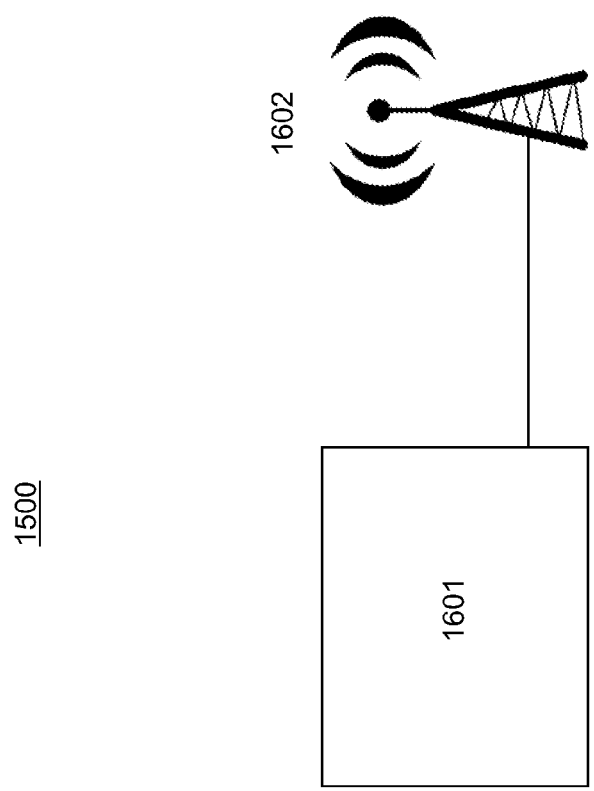

CASCADE ADAPTIVE REGULATOR TAP MANAGER METHOD AND SYSTEM

CROSS-REFERENCE TO RELATED APPLICATIONS

This application claims the benefit of priority of International Patent Application No. PCT/US2013/030961 filed Mar. 13, 2013, which claims the benefit of priority of U.S. provisional patent application No. 61/761,180 filed Feb. 5, 2013, each of which are incorporated herein by reference in their entirety.

The current application is also related to the disclosures of the applications set forth in Appendix A to this document, the entire contents of each of which are incorporated herein by reference.

TECHNICAL FIELD

The disclosed embodiments relate to a method for regulating electric power being supplied to one or more electrical or electronic loads and more particularly to adjusting voltage levels of power provided to the electrical or electronic device(s) based on estimates determined from the electrical or electronic device(s) consumption.

BACKGROUND

A method and apparatus for regulating electric power being supplied to one or more electrical or electronic device(s) is disclosed.

When supplying power to large industrial devices that consume a tremendous amount of electrical power, several needs compete and must be simultaneously considered in managing electrical power distribution. A first concern has to do with maintaining delivered electrical power voltage levels within predetermined limits. A second concern relates improving overall efficiency of electrical power usage and distribution. A third concern relates to these and other concerns in light of changing electrical loading of the system and variations in the character of the loading so that the voltages do not decrease to such a level that the devices shut down or function improperly.

One way to accommodate changes in electrical loading is to set preset threshold levels at which the voltage level of the distribution system changes. When the system detects a change in the voltage level, a tap change is initiated (on a multiple-tap transformer) resulting in a system voltage change. A drawback of this system is that the tap may change frequently thus increasing the tap mechanism failure rate. Further the system voltage level may drop suddenly so the preset threshold levels must be set sufficiently high to prevent shutdown resulting in system inefficiencies.

SUMMARY

In one implementation a method is disclosed that continuously detects measurements of electrical power supplied to one or more electrical devices from a power source. Estimated deviant voltage levels that the supplied electricity will not drop below or exceed as a result of varying electrical consumption by the one or more electrical devices are continuously computed. The deviant voltage levels may be computed based on a predetermined confidence level and specific properties of the effects on measured voltage due to varying consumption computed from the detected measurements. A voltage level output of the electricity supplied to the electrical device may be adjusted based on the computed deviant voltage level. In an additional implementation, the deviant voltage levels may be based on measurements obtained from each of the three phases in a three-phase electric power distribution system. A voltage level supplied to the three-phase distribution system may be adjusted by a voltage regulator capable of setting three-phase voltages.

In another implementation, a system is disclosed including an electronic meter, a processor and a voltage regulator device. The electronic meter continuously detects measurements of electricity supplied to one or more electrical devices from a power source. The processor is in communication with the electronic meter to continuously compute estimated deviant voltage levels that the supplied electricity will not drop below or exceed as a result of varying electrical consumption by the electrical device and the detected measurements. The voltage regulator device receives a signal from the processor to adjust a voltage level output of the electricity supplied to the electrical device from the power source based on the computed deviant voltage level.

In addition, a computer readable storage medium comprising instructions is disclosed. The instructions when executed by a processor continuously detect measurements of electricity supplied to one or more devices from a power source. The instructions also continuously compute estimated deviant voltage levels that the supplied electricity are not expected to drop below or to exceed with some level of confidence as a result of varying electrical consumption by the one or more electrical devices. In one implementation the deviant voltage level is computed based on a predetermined confidence level and the detected measurements. The instructions also provide a signal to adjust a voltage level output of the electricity supplied to the one or more electrical devices based on the computed estimated deviant voltage level.

In one aspect, a method is disclosed of controlling the operation of a system for providing electrical power to one or more electrical devices, the system including an adjustable power source root node and one or more adjustable power source remote nodes located remotely from the root node, the method including: for each of the root and remote nodes: continuously detecting measurements of electricity supplied to one or more electrical devices from a power source associated with the node; continuously computing estimated deviant voltage levels that the supplied electricity will not drop below or exceed as a result of varying electrical consumption by the one or more electrical devices, the deviant voltage level being computed based on a predetermined confidence level and the detected measurements; outputting definite adjustment information indicative of an adjustment to or maintenance of a voltage level output of the electricity supplied to the electrical device based on the computed deviant voltage level; outputting anticipated adjustment information indicative of an anticipated adjustment to the voltage level based on the computed deviant voltage level; and applying a first decision function for at least one remote node to generate node control information for controlling the voltage level output of the remote node based on: the definite adjustment information, the anticipated adjustment information, and source information indicative of a voltage offset applied by one or more nodes upstream of the remote node; and controlling the voltage level output of the remote node based on the node control information.

In some embodiments, the step of continuously computing estimated deviant voltage is based at least in part on information indicative of at least one of a location statistic and a scale statistic of the detected measurements.

In some embodiments, the step of continuously computing estimated deviant voltage is based at least in part on information indicative of both a location statistic and a scale statistic of the detected measurements.

In some embodiments, the location statistic includes information indicative of a central tendency. In some embodiments, the scale statistic includes information indicative of a variance or a standard deviation or a dispersion.

In some embodiments, the system includes one or more cascades of source nodes each cascade including the root voltage source and at least two remote voltage sources. Some embodiments include: grouping nodes in a plurality of cascade level groups, the cascade level group being indicative of the number of remote nodes upstream of each node in the level; applying the first decision matrix to each of the nodes in a first cascade level having no upstream remote nodes; and successively applying the first decision matrix on a level by level basis to each of the nodes in one or more additional cascade level groups.

In some embodiments the system includes at least one paired remote node that is not part of a cascade. Some embodiments include identifying the paired remote node; applying a paired decision function different than the first decision function to generate source control information for controlling the voltage level output of the paired node based on: the definite adjustment information for the paired node, the anticipated adjustment information for the paired node, the definite adjustment information for a master node; and the anticipated adjustment information for a master node.

In some embodiments, each of the root and remote nodes is connected to a respective regulator having multiple tap settings with each tap setting supplying electricity with a different voltage level. In some embodiments, where adjusting the voltage level output of the electricity supplied to the one or more electrical devices based on the computed deviant voltage level includes: detecting a tap setting and a regulator load voltage of one or more taps of the regulating transformer; asserting a decrease in one of the regulator multiple tap settings if either a selected estimated deviant voltage exceeds a predetermined voltage level derived from a setpoint voltage or an accumulated nonlinear weighted time integral of the a selected minimum estimated deviant voltage exceeds the predetermined voltage level; asserting an increase in one of the regulator multiple tap settings if either a selected estimated deviant voltage fall below a predetermined voltage level derived from a setpoint voltage, or an accumulated nonlinear weighted time integral of a selected minimum estimated deviant voltage falls below the predetermined voltage level; and otherwise asserting a maintenance of current the regulator multiple tap setting.

In some embodiments, for each remote node: the definite adjustment information is indicative of an asserted increase, asserted decrease, or an asserted maintenance of current the regulator multiple tap setting; and the anticipated adjustment information is based on the estimated deviant voltage or the accumulated nonlinear weighted time integral of a selected minimum estimated deviant voltage.

In some embodiments, the anticipated adjustment information is based on at least one selected from the list consisting of: a difference between the a selected estimated deviant voltage and at least one setpoint voltage; a rate of change of the difference between the a selected estimated deviant voltage an at least one setpoint voltage; a direction of change between the a selected estimated deviant voltage an at least one setpoint voltage.

In some embodiments, applying the first decision function to each remote node includes: determining a source effect voltage forecast based on the voltage level output by the remote node and a voltage offset applied by the one or more nodes upstream of the remote node; and determining a source effect voltage forecast classification by comparing the forecast to a setpoint voltage, a low boundary voltage lower than the set point voltage, and a high boundary voltage higher than the set point voltage.

Some embodiments include identifying the source effect voltage forecast with at least one of the following forecast states: a first forecast state corresponding to a forecast lower than the low boundary voltage $V_{lo}$; a second forecast state corresponding to a forecast higher than the low boundary voltage $V_{lo}$ and lower than the set point voltage $V_{SET}$ minus a voltage offset $\Delta V_{dn}$ corresponding to a tap decrease; a third forecast state corresponding to a forecast higher than the set point voltage $V_{SET}$ minus the voltage offset $\Delta V_{dn}$ and lower than the setpoint $V_{SET}$; a fourth forecast state corresponding to a forecast higher than the set point voltage $V_{SET}$ and lower than the set point voltage $V_{SET}$ plus a voltage offset $\Delta V_{up}$ corresponding to a tap increase; a fifth forecast state corresponding to a forecast higher than the set point voltage $V_{SET}$ plus the voltage offset $\Delta V_{up}$ and lower than the high boundary voltage $V_{hi}$; and a sixth forecast state corresponding to a forecast higher than the high boundary voltage $V_{hi}$.

Some embodiments include determining a local prior state classification for the remote node based on the definite adjustment information and the anticipated adjustment information.

Some embodiments include identifying the local prior state with at least one of the following local states: a first local state indicating a locally asserted tap increase; a second local state indicating an approach to a locally asserted tap increase; a third local state indicating a voltage level in a dead band range corresponding to no tap increase; a fourth local state indicating an approach to a locally asserted tap decrease; and a fifth local state indicating a locally asserted tap increase.

Some embodiments include asserting or negating a locally asserted tap increase based on the local prior state classification and the source effect voltage forecast classification.

Some embodiments include asserting or negating a locally asserted tap decrease based on the local prior state classification and the source effect voltage forecast classification.

In some embodiments, applying the first decision function further includes: asserting a tap increase if: the source effect voltage forecast is in the first forecast state and the local prior state is in the first or second local state; or the source effect voltage forecast is in the second forecast state and the local prior state is in the first local state.

In some embodiments, applying the first decision function further includes: negating the locally asserted tap increase if: the source effect voltage forecast is in the third, fourth, fifth, or sixth forecast state and the local prior state is in the first local state.

In some embodiments, where applying the first decision function further includes: asserting a tap decrease if: the source effect voltage forecast is in the sixth forecast state and the local prior state is in the fourth or fifth local state; or the source effect voltage forecast is in the fifth forecast state and the local prior state is in the fifth local state.

In some embodiments, applying the first decision function further includes: negating the locally asserted tap decrease if: the source effect voltage forecast is in the first second, third, or fourth forecast state and the local prior state is in the fifth local state.

Some embodiments include clearing or maintaining at least one accumulated nonlinear weighted time integral of a selected minimum estimated deviant voltage based on the local prior state classification and the source effect voltage forecast classification.

Some embodiments include, if the local state is classified as a third local state indicating a voltage level in a dead band range corresponding to no tap increase: determining if the voltage level is above or below a setpoint within the dead band; and based on the determination and the forecast state classification, adjusting at least one at least one accumulated nonlinear weighted time integral of a selected minimum estimated deviant voltage for the remote node.

Some embodiments including receiving information indicative of the topology of the nodes in the system for providing electrical power.

Some embodiments include determining information indicative of the topology of the nodes in the system for providing electrical power based on detected information indicative of the state of one or more switching devices in the system.

In some for each node, continuously computing of the estimated deviant voltage level that the supplied electricity will not drop below or exceed as a result of the electrical consumption by the electrical device and the detected measurements includes: simultaneously processing the voltage time series of the supplied electricity along multiple paths including: filtering the voltage time series to derive a filtered voltage time series; estimating a smooth delay compensated zero-mean dispersion of the voltage time series; and producing a delay compensated smoothed negative peak envelope of the voltage time series.

In some embodiments, the continuous computing of the estimated deviant voltage levels that the supplied electricity will not drop below or exceed as a result of the electrical consumption by the one or more electrical devices includes at least one of: (i) estimating a low-pass spectral behavior of one or more observed voltage time series of the electricity supplied to the one or more electrical devices, with a spectral cutoff frequency consistent with a voltage adjustment decision period; (ii) estimating a dispersion or variance of each observed voltage time series; (iii) estimating a first-order envelope of the minimum values of each observed voltage time series; (iv) applying weighting factors to the estimated dispersions consistent with configured confidence specifications thereby estimating a voltage deviation that will not be exceeded with the specified confidence; (v) computing a forecast minimum for each observed voltage time series by combining the results of (i), (iii), and (iv) and selecting a forecast minimum voltage from these results; (vi) comparing the selected forecast minimum voltage against a pre-specified voltage bound; (vii) incrementing a nonlinear weighted time integral for the selected forecast minimum voltage if the forecast minimum voltage is more than one regulator tap step voltage below the target but greater than a lower voltage bound; and (viii) decrementing a nonlinear weighted time integral if the selected forecast minimum voltage approaches the target voltage closer than one regulator tap step voltage.

In some embodiments, the continuous computing of the estimated deviant voltage levels that the supplied electricity will not drop below or exceed as a result of the electrical consumption by the one or more electrical devices includes at least one of: (i) estimating a low-pass spectral behavior of one or more observed voltage time series of the electricity supplied to the one or more electrical devices, with a spectral cutoff frequency consistent with a voltage adjustment decision period; (ii) estimating a dispersion or variance of each observed voltage time series; (iii) estimating a first-order envelope of the minimum values of each observed voltage time series; (iv) applying weighting factors to the estimated dispersions consistent with configured confidence specifications thereby estimating a voltage deviation that will not be exceeded with the specified confidence; (v) computing a forecast minimum for each observed voltage time series by combining the results of (i), (iii), and (iv) and selecting a forecast minimum voltage from these results; (vi) comparing the selected forecast minimum voltage against a pre-specified voltage bound; (vii) incrementing a nonlinear weighted time integral for the selected forecast minimum voltage if the forecast minimum voltage is more than one regulator tap step voltage above the target but less than an upper voltage bound; and (viii) decrementing a nonlinear weighted time integral if the selected forecast minimum voltage approaches the target voltage closer than one regulator tap step voltage.

Some embodiments include controlling a voltage adjustment at one or more of the remote nodes In some embodiments, where the telemetry system includes at least one selected from the list consisting of: a wired network, a wireless network, a satellite based communication system; a wireless mesh network; an internet; a cellular network; a data through power line network, an optical fiber network, and combinations thereof.

In another aspect, a non-transitory computer readable storage medium is disclosed including instructions which when executed by a processor implements the steps of any of the above described methods.

In another aspect, a system is disclosed for controlling the operation of power supply system for providing electrical power to one or more electrical devices, the system including an adjustable power source root node and one or more adjustable power source remote nodes located remotely from the root node, the system including: a processor configured to implement the steps of any of the above described methods.

Some embodiments include at least one telemetry system operatively connecting the processor to one or more of the remote nodes.

In some embodiments, the telemetry system includes at least one selected from the list consisting of: a wired network, a wireless network, a satellite based communication system; a wireless mesh network; an internet; a cellular network; a data through power line network, an optical fiber network, and combinations thereof.

Some embodiments include: a plurality of sensors configured to measure information indicative of a voltage output by each node in the system.

In some embodiments, the plurality of sensors are operatively connected to the processor using a data communication apparatus.

In some embodiments the data communication apparatus includes at least one selected from the list consisting: a wired network, a wireless network, a satellite based communication system; a wireless mesh network; an internet; a cellular network; a data through power line network, an optical fiber network, and combinations thereof.

In another aspect, a method is disclosed of controlling the operation of a system for providing electrical power to one or more electrical devices, the system including an adjustable power source master node and an adjustable power source slave node located remotely from the master node, the method including: for each of the master and slave nodes: continuously detecting measurements of electricity supplied to one or more electrical devices from a power source associated with the node; continuously computing estimated deviant voltage levels that the supplied electricity will not drop below or exceed as a result of varying electrical consumption by the one or more electrical devices, the deviant voltage level being computed based on a predetermined confidence level and the detected measurements; outputting definite adjustment information indicative of an adjustment to or maintenance of a voltage level output of the electricity supplied to the electrical device based on the computed deviant voltage level; outputting anticipated adjustment information indicative of an anticipated adjustment to the voltage level based on the computed deviant voltage level; and applying a paired decision function to generate node control information for controlling the voltage level output of the master and slave nodes node based on: the definite adjustment information for the slave node, the anticipated adjustment information for the slave node, and the definite adjustment information for the master node, the anticipated adjustment information for the master node, and controlling the voltage level output of the master and slave nodes based on the node control information.

In some embodiments, each of the master and slave nodes is connected to a respective regulator having multiple tap settings with each tap setting supplying electricity with a different voltage level, and adjusting the voltage level output of the electricity supplied to the one or more electrical devices based on the computed deviant voltage level includes: detecting a tap setting and a regulator load voltage of one or more taps of the regulating transformer; locally asserting a decrease in one of the regulator multiple tap settings if either a selected estimated deviant voltage exceeds a predetermined voltage level derived from a setpoint voltage or an accumulated nonlinear weighted time integral of the a selected minimum estimated deviant voltage exceeds the predetermined voltage level; locally asserting an increase in one of the regulator multiple tap settings if either a selected estimated deviant voltage fall below a predetermined voltage level derived from a setpoint voltage, or an accumulated nonlinear weighted time integral of a selected minimum estimated deviant voltage falls below the predetermined voltage level; and otherwise locally asserting a maintenance of current the regulator multiple tap setting.

In some embodiments, each of the master node and the slave node: the definite adjustment information is indicative of an asserted increase, asserted decrease, or an asserted maintenance of current the regulator multiple tap setting; and the anticipated adjustment information is based on the estimated deviant voltage or the accumulated nonlinear weighted time integral of a selected minimum estimated deviant voltage.

In some embodiments, the anticipated adjustment information for each node is based on at least one selected from the list consisting of: a difference between the a selected estimated deviant voltage and at least one setpoint voltage; a rate of change of the difference between the a selected estimated deviant voltage an at least one setpoint voltage; a direction of change between the a selected estimated deviant voltage an at least one setpoint voltage.

In some embodiments, applying the paired decision function to each remote node includes determining a master node local prior state classification for the master node based on the definite adjustment information and the anticipated adjustment information.

Some embodiments include identifying master node local prior state classification for the master node with at least one of the following forecast states: a first local state indicating a locally asserted tap increase; a second local state indicating an approach to a locally asserted tap increase; a third local state indicating a voltage level in a dead band range corresponding to no tap increase; a fourth local state indicating an approach to a locally asserted tap decrease; and a fifth local state indicating a locally asserted tap increase.

Some embodiments include determining a slave node local prior state classification for the slave node based on the definite adjustment information and the anticipated adjustment information.

Some embodiments include identifying the slave node local prior state classification with at least one of the following local states: a first local state indicating a locally asserted tap increase; a second local state indicating an approach to a locally asserted tap increase; a third local state indicating a voltage level in a dead band range corresponding to no tap increase; a fourth local state indicating an approach to a locally asserted tap decrease; and a fifth local state indicating a locally asserted tap increase.

Some embodiments include asserting or negating a locally asserted master node or slave node tap increase based on the master node and slave node local prior state classifications.

Some embodiments include asserting or negating a locally asserted master node or slave node tap decrease based on the master node and slave node local prior state classifications.

Some embodiments include adjusting at least one accumulated nonlinear weighted time integral of a selected minimum estimated deviant voltage based on the master node an slave node local prior states.

Some embodiments include, if the local state is classified as a third local state indicating a voltage level in a dead band range corresponding to no tap increase: determining if the slave node voltage level is above or below a setpoint within the dead band; and based on the determination and the master local prior state classification, adjusting at least one at least one accumulated nonlinear weighted time integral of a selected minimum estimated deviant voltage for the slave node.

Some embodiments include receiving information indicative of the topology of the nodes in the system for providing electrical power.

Some embodiments include determining information indicative of the topology of the nodes in the system for providing electrical power based on detected information indicative of the state of one or more switching devices in the system.

In some embodiments, for each node, continuously computing of the estimated deviant voltage level that the supplied electricity will not drop below or exceed as a result of the electrical consumption by the electrical device and the detected measurements includes: simultaneously processing the voltage time series of the supplied electricity along multiple paths including: filtering the voltage time series to derive a filtered voltage time series; estimating a smooth delay compensated zero-mean dispersion of the voltage time series; and producing a delay compensated smoothed negative peak envelope of the voltage time series.

In some embodiments, the continuously computing of the estimated deviant voltage levels that the supplied electricity will not drop below or exceed as a result of the electrical consumption by the one or more electrical devices includes at least one of: (i) estimating a low-pass spectral behavior of one or more observed voltage time series of the electricity supplied to the one or more electrical devices, with a spectral cutoff frequency consistent with a voltage adjustment decision period; (ii) estimating a dispersion or variance of each observed voltage level; (iii) estimating a first-order envelope of the minimum values of each observed voltage level; (iv) applying weighting factors to the estimated dispersions consistent with configured confidence specifications thereby estimating a voltage deviation that will not be exceeded with the specified confidence; (v) computing a forecast minimum for each observed voltage by combining the results of (i), (iii), and (iv) and selecting a forecast minimum voltage from these results; (vi) comparing the selected forecast minimum voltage against a pre-specified voltage bound; (vii) incrementing a nonlinear weighted time integral for the selected forecast minimum voltage if the forecast minimum voltage is less than one regulator tap step voltage below the target but greater than a lower voltage bound; and (viii) decrementing a nonlinear weighted time integral if the selected forecast minimum voltage approaches the target voltage closer than one regulator tap step voltage.

Some embodiments include controlling a voltage adjustment at the slave node using on or more telemetry systems.

In some embodiments, the telemetry system includes at least one selected from the list consisting of: a wired network, a wireless network, a satellite based communication system; a wireless mesh network; an internet; a cellular network; a data through power line network, an optical fiber network, and combinations thereof.

In another aspect, a system for controlling the operation of power supply system for providing electrical power to one or more electrical devices, the system including an adjustable power source master node and a slave node adjustable power located remotely from the root node, the system including: a processor configured to implement the steps of any of the above methods.

Some embodiments include at least one telemetry system operatively connecting the processor to the slave node.

In some embodiments, the telemetry system includes at least one selected from the list consisting of: a wired network, a wireless network, a satellite based communication system; a wireless mesh network; an internet; a cellular network; a data through power line network, an optical fiber network, and combinations thereof.

Some embodiments include a plurality of sensors configured to measure information indicative of a voltage output by each node in the system.

In some embodiments, the plurality of sensors are operatively connected to the processor using a data communication apparatus.

In some embodiments, the data communication apparatus includes at least one selected from the list consisting of: a wired network, a wireless network, a satellite based communication system; a wireless mesh network; an internet; a cellular network; a data through power line network, an optical fiber network, and combinations thereof.

In some embodiments, the slave node is substantially the only adjustable power source in the system located remote from the master node.

In another aspect, a non-transitory computer readable storage medium is disclosed including instructions which when executed by a processor implements the steps of any of the above described methods.

Various embodiments may include any of the above described elements, either alone, or in any suitable combination.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 11 is a voltage adjustment decision matrix for a master-slave power supply system.

FIG. 13 is a voltage adjustment decision matrix for a cascaded power supply system.

FIG. 15 is a alternative embodiment of a voltage adjustment decision matrix for a cascaded power supply system.

FIG. 16 is a system for implementing regulation management in a master-slave or cascaded power supply system.

DETAILED DESCRIPTION

Figure 1:
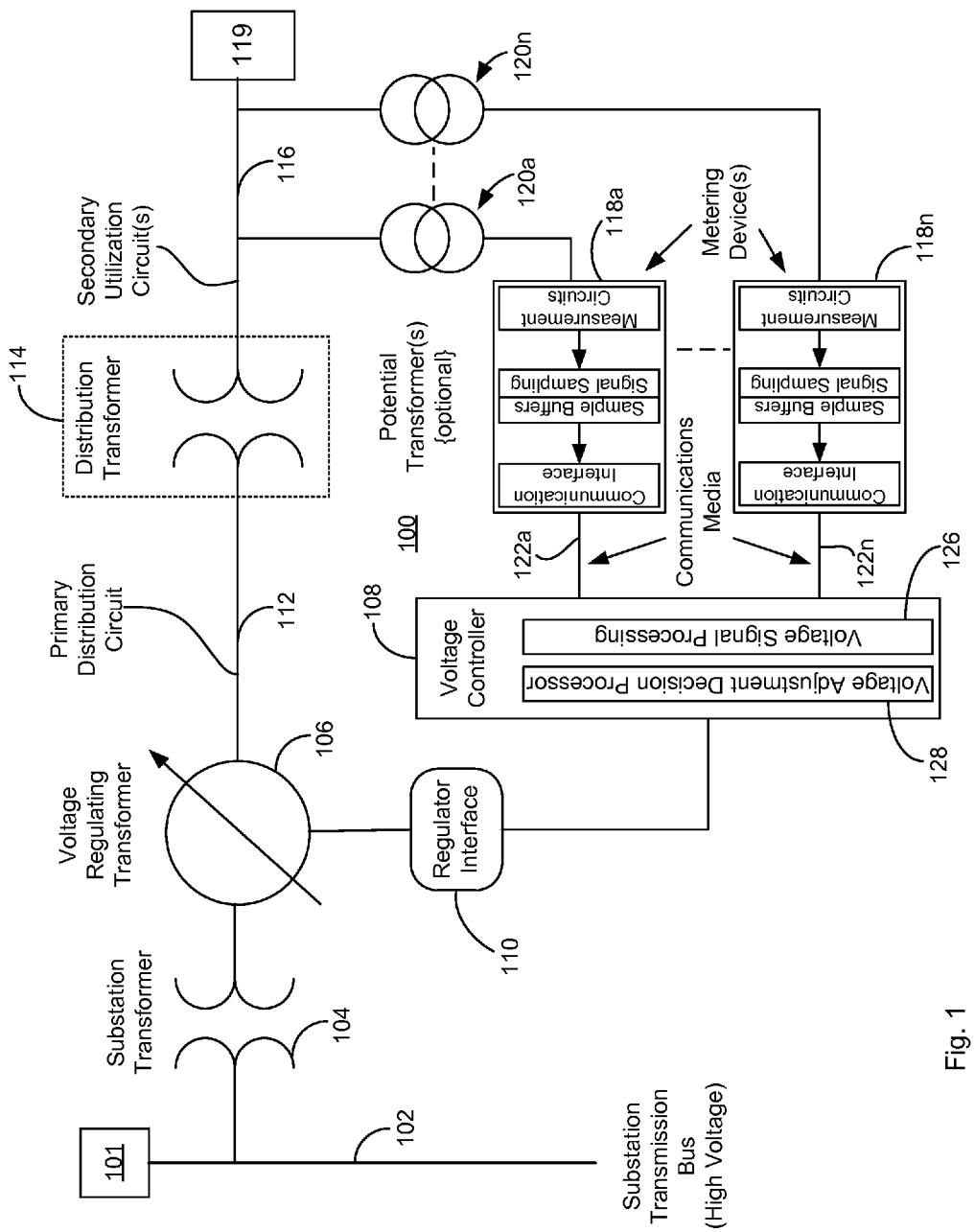
FIG. 1 is a simplified schematic diagram of a voltage control system for regulating power.

Referring to FIG. 1 there is shown a voltage control system 100 having power source 101 connected via a subsystem transmission bus 102 and via substation transformer 104 to a voltage regulating transformer 106. Voltage regulating transformer 106 is controlled by voltage controller 108 with regulator interface 110. Voltage regulating transformer 106 is optionally coupled on primary distribution circuit 112 via optional distribution transformer 114 to secondary utilization circuits 116 and to one or more electrical or electronic devices 119. Voltage regulating transformer 106 has multiple tap outputs (not shown) with each tap output supplying electricity with a different voltage level. The illustrated system described herein may be implemented as either a single-phase or three-phase distribution system.

In an AC Power distribution system and as used herein voltage may be generally is referred to as an "RMS Voltage". The regulating transformer 106 is typically one of two basic types: (1) a multi-tap autotransformer (single or three phase), which are used for distribution; or (2) on-load tap changer (three phase transformer), which is integrated into a substation transformer and used for both transmission and distribution.

Monitoring devices 118a-118n are coupled through optional potential transformers 120a-120n to secondary utilization circuits 116. Monitoring devices 118a-118n continuously detects measurements and continuous voltage signals of electricity supplied to one or more electrical devices 119 connected to circuit 112 or 116 from a power source 101 coupled to bus 102. Monitoring devices 118a-118n are coupled through communications media 122a-122n to voltage controller 108.

Voltage controller 108 continuously computes estimated deviant voltage levels that the supplied electricity will not drop below or exceed as a result of varying electrical consumption by the one or more electrical devices. The deviant voltage levels are computed based on a predetermined confidence level and the detected measurements (as explained in more detailed herein). Voltage controller 108 includes a voltage signal processing circuit 126 that receives sampled signals from metering devices 118a-118n. Metering devices 118a-118n process and sample the continuous voltage signals such that the sampled voltage signals are uniformly sampled as a time series that are free of spectral aliases. Such metering devices having this process and sample capability are generally commercially available.

Voltage signal processing circuit 126 receives signals via communications media from metering devices 118 processes the signals and feeds them to voltage adjustment decision processor circuit 128. Although the term "circuit" is used in this description, the term is not meant to limit this disclosure to a particular type of hardware or design, and other terms known generally known such as the term "element", "hardware", "device" or "apparatus" could be used synonymously with or in place of term "circuit" and may perform the same function. For example, in some embodiments the functionality may be carried out using one or more digital processors, e.g., implementing one or more digital signal processing algorithms. Adjustment decision processor circuit 128 determines a voltage location with respect to a defined decision boundary and sets the tap position and settings in response to the determined location. More specifically adjustment decision processing circuit 128 in voltage controller 108 computes a deviant voltage level that is used to adjust the voltage level output of electricity supplied to the electrical device. In other words, one of the multiple tap settings of regulating transformer 106 is continuously selected by voltage controller 108 via interface 110 to supply electricity to the one or more electrical devices based on the computed deviant voltage level. Regulator interface 110 may include a processor controlled circuit for selecting one of the multiple tap settings in voltage regulating transformer 106 in response to an indication signal from voltage controller 108.

As the computed deviant voltage level changes other tap settings (or settings) of regulating transformer 106 are selected by voltage controller 108 to change the voltage level of the electricity supplied to the one or more electrical devices.

Figure 2:
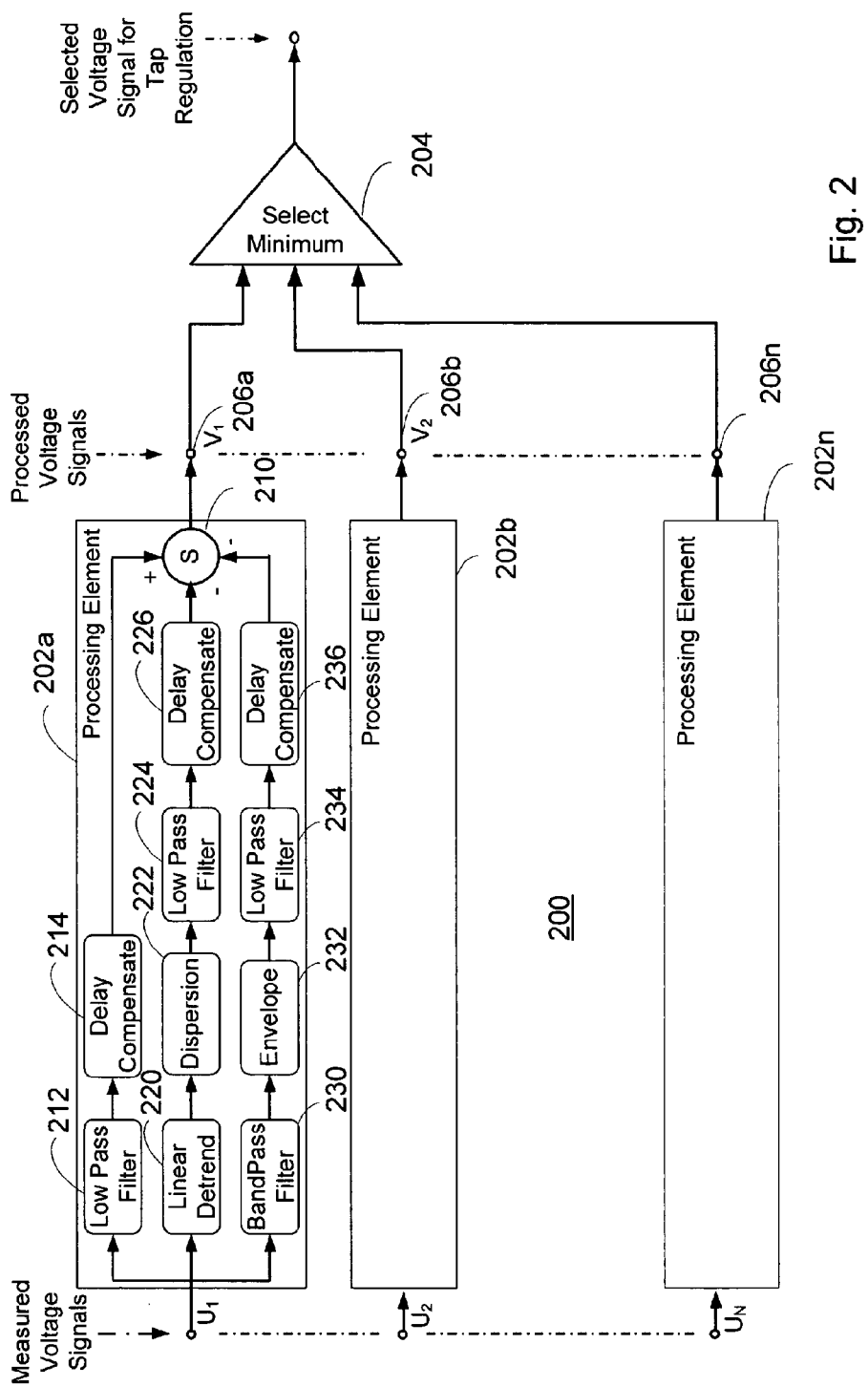
FIG. 2 is a simplified schematic diagram of a voltage signal processing element shown in FIG. 1 that processes measured voltage signals to provide a selected voltage signal for tap regulation.

Referring to FIG. 2, voltage signal processing element 200 is shown having processing elements 202a-202n coupled to minimum selector circuit 204. Each of the processing elements 202a-202n receives on their respective input terminals a measured voltage signal from a respective metering device 118a-118n (FIG. 1). Processing elements 202a-202n processes the measured signal (as described herein) and generates a processed voltage signal on their output terminals 206a-206n respectively. Minimum selector circuit 204 selects the processed voltage signal having the minimum voltage and provides the selected signal to the voltage adjustment decision processor circuit 128 for further processing in tap setting regulation.

Processing elements 202a-202n are identical and thus only one element, 202a will be described. Processing element 202a includes three parallel processing paths that are coupled to summation circuit 210. Each of the processing elements receives sampled time series signals from metering devices 118a-118n.

In the first path, a low pass filter circuit 212 receives the measured voltage signal, applies a low pass filter to the signal and feeds the low pass filtered signal to delay compensate circuit 214 where the signal or an estimate of the signal is extrapolated in time such that the delay resulting from the low pass filtering operation is removed and then fed to summation circuit 210.

In the second path, a linear detrend circuit 220 receives the measured voltage signal, and removes any linear trends from the signal. In some embodiments, the applied detrending may include at least one of the following processes (1) linear trend removal by subtraction of regression line estimated on some finite number of signal samples, (2) high-pass filtering such that the low frequency components of the signal (specifically including the zero-frequency or average component) are removed, or (3) band-pass filtering with the same intent as (2).

Figure 6:
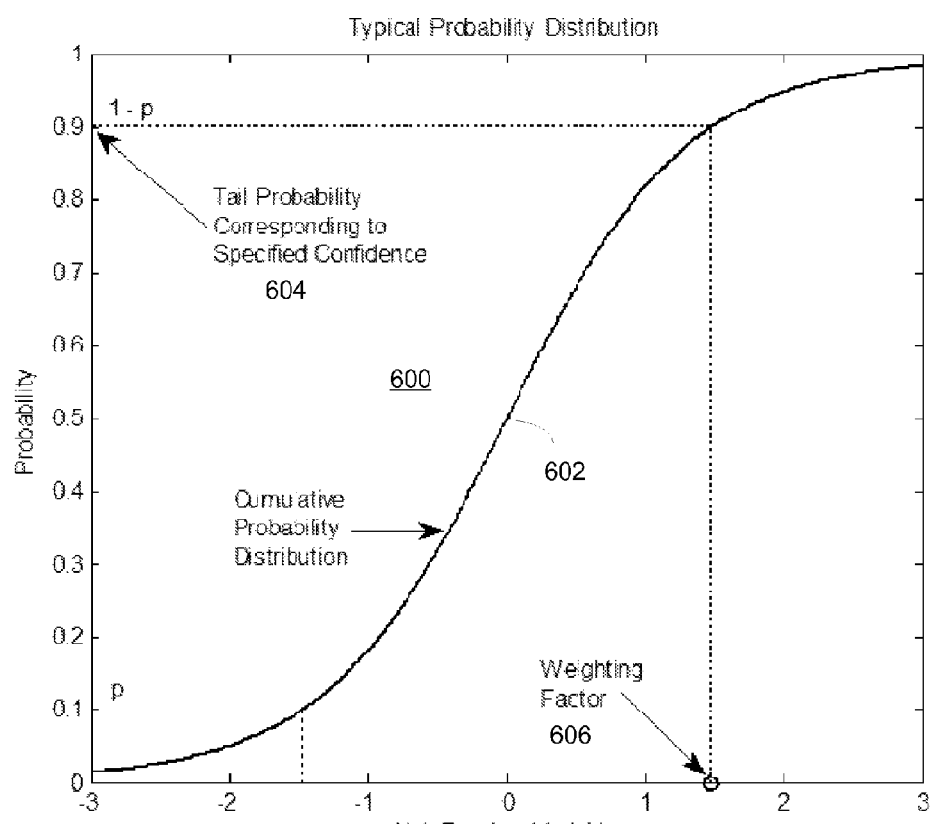
FIG. 6 is a diagram illustrating a typical probability distribution of the voltage control system that is used to select a weighting factor that is used in estimating voltage deviations.

The resulting signal, having zero mean and being devoid of any change in its average value over its duration, is then applied to dispersion circuit 222 where a zero mean dispersion is estimated for the signal. The zero mean dispersion estimated signal is fed to low pass filter circuit 224 that applies a low pass filter to the signal. The filtered signal is then fed to delay compensation circuit 226 where the filtered signal or an estimate of the filtered signal is extrapolated in time such that the delay resulting from the low pass filtering operation is removed. A weighting factor 606 is shown in FIG. 6 and is described in connection therewith. Weighting factor 606 is derived from a specified confidence level as described herein and is applied to the signal output from element 226 before being fed as a delay compensated signal to summation circuit 210.

In the third path, a band pass filter circuit 230 receives the measured voltage signal, and applies a band pass filter to the signal. The filtered signal is then applied to an envelope circuit 232 where the signal is formed into a peak envelope with specified peak decay characteristics. The peak envelope signal is fed to low pass filter circuit 234 that applies a low pass filter to the signal to provide a filtered smooth peak envelope voltage signal, and feeds the signal to delay compensation circuit 236 where the filtered smooth peak envelope voltage signal or an estimate thereof is extrapolated in time such that the delay resulting from the low pass filtering operation is removed before being fed to as a delay compensated signal to summation circuit 210.

Example Voltage Controller Architecture

Figure 3:
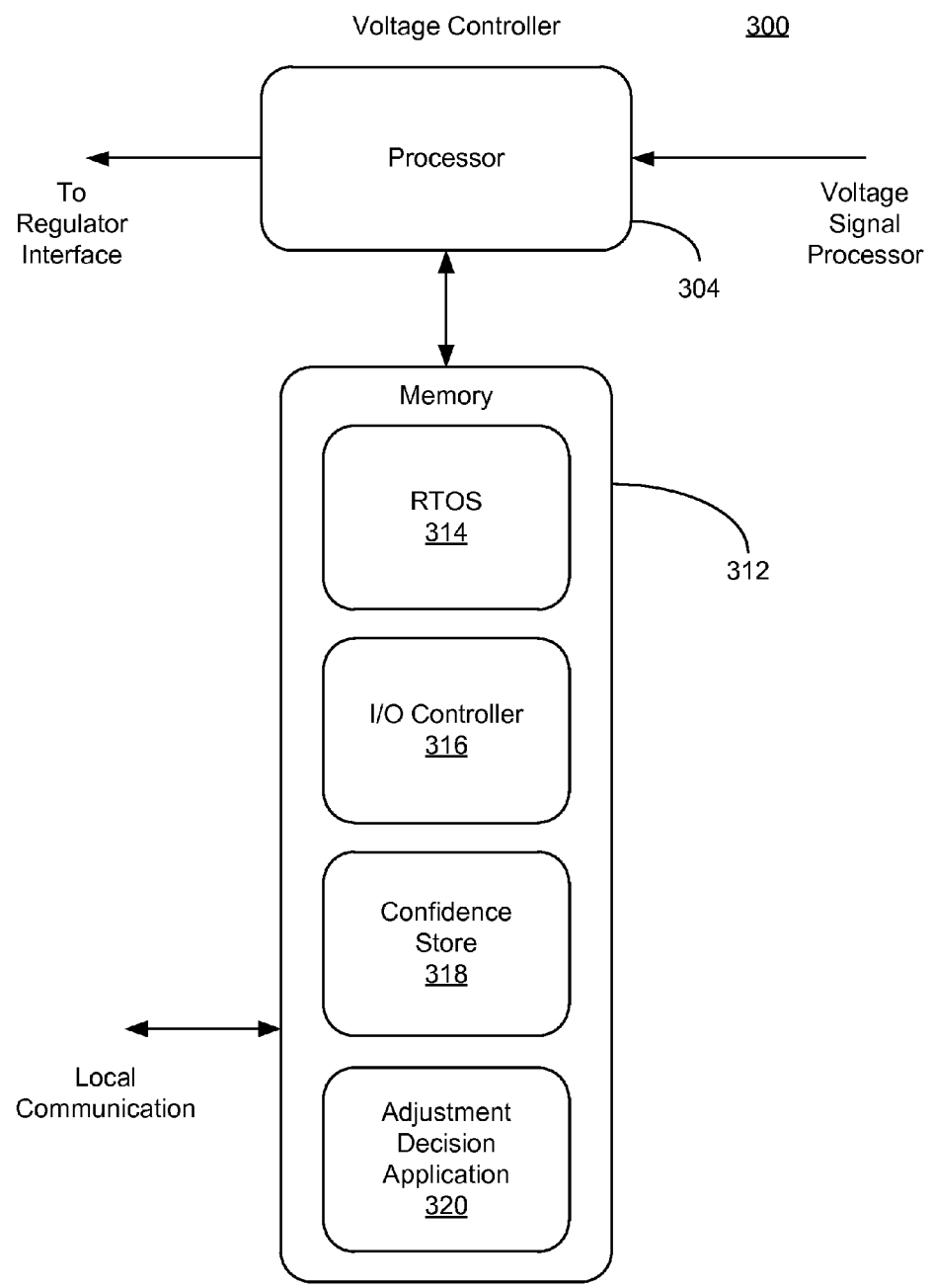
FIG. 3 is a simplified schematic diagram of a voltage controller shown in FIG. 1.
Figure 4:
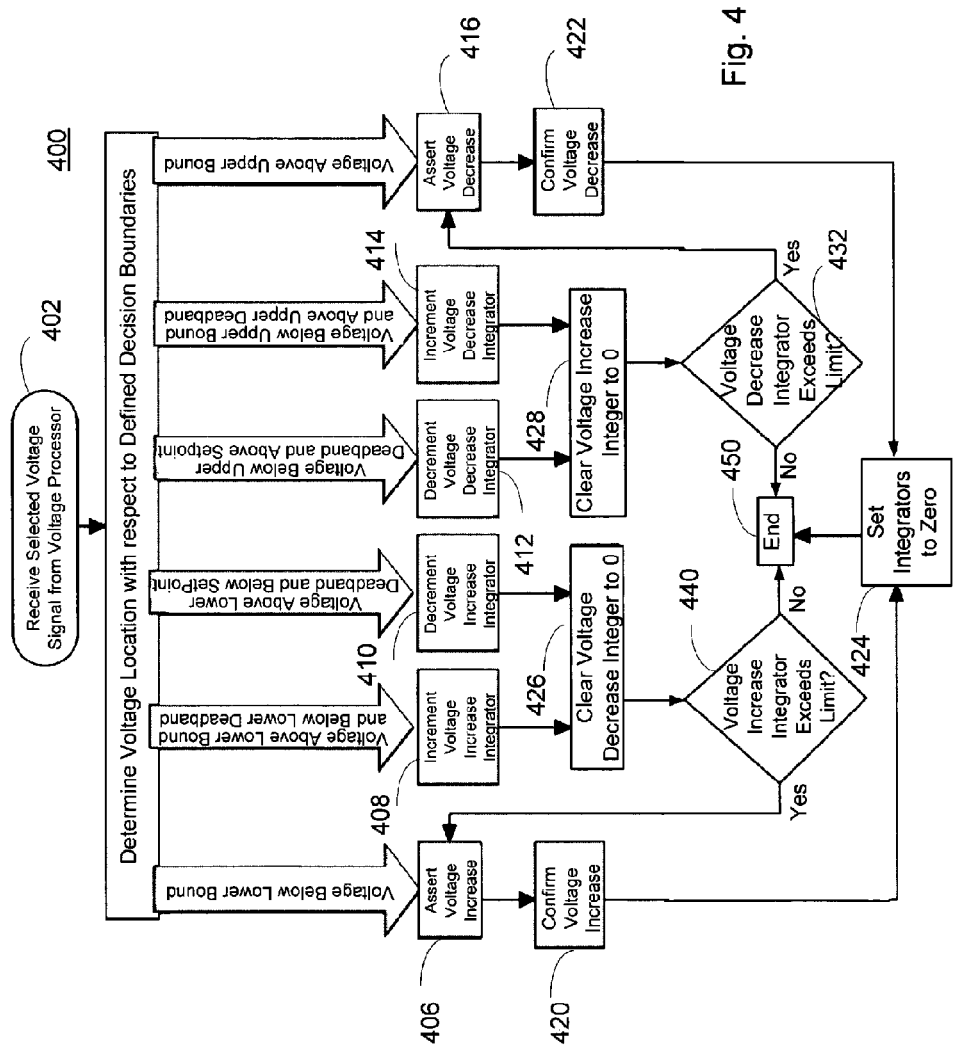
FIG. 4 is a flow chart of a process for determining a voltage adjustment decision by the voltage controller shown in FIG. 3.

In FIG. 3 are illustrated selected modules in Voltage Controller 300 using process 400 shown in FIG. 4. Voltage Controller receives Signals from voltage signal processing circuit 126 and feeds signals to regulator interface 110. Voltage Controller 300 has processing capabilities and memory suitable to store and execute computer-executable instructions. In one example, Voltage Controller 300 includes one or more processors 304 and memory 312.

The memory 322 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 322 of the Voltage Controller 300 may include a real time operating system 314, an I/O controller 316, a confidence store 318, and an adjustment decision application 320. Real time operating system 314 may be used by adjustment decision application 320 to operate controller 300. I/O controller may provide drivers for Voltage controller to communicate with Voltage signal processor or regulator interface. A confidence store 318 may include preconfigured parameters (or set by the user before or after initial operation) such a confidence values, electrical device operating parameters, voltage levels, deadband, setpoint values and probabilities. Such values may be update through an interface with the user directly to the voltage controller (not shown). Details of the adjustment decision application and process are described in FIG. 4.

Illustrated in FIG. 4, is a process 400 for determining a voltage adjustment decision. The exemplary process in FIG. 4 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 4, although it may be implemented in other system architectures.

Figure 5:
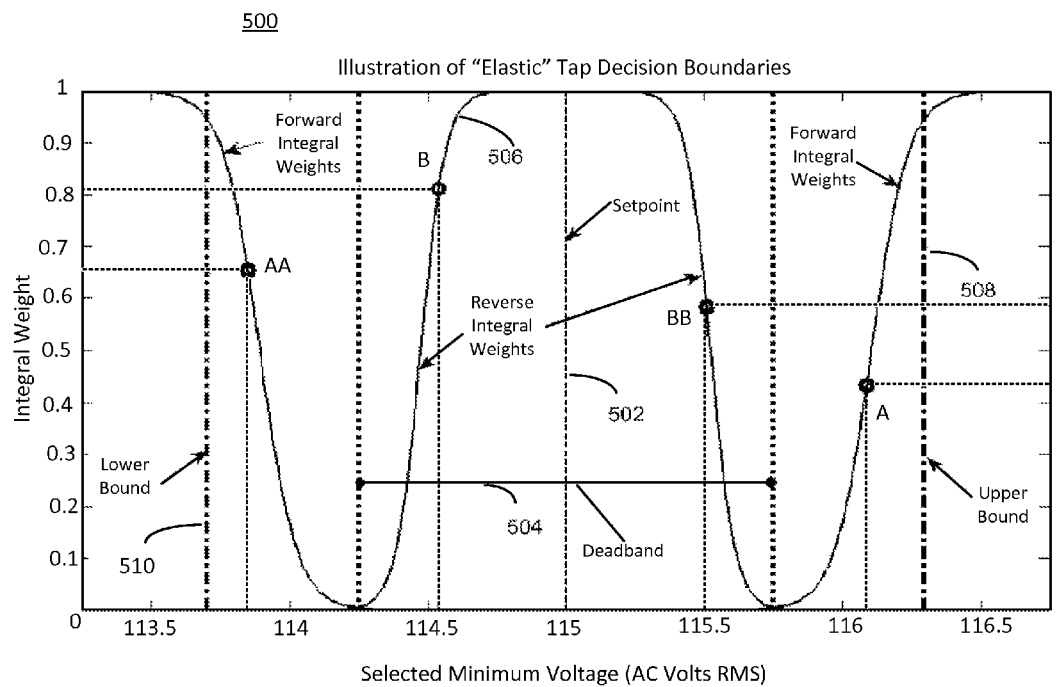
FIG. 5 is a diagram illustrating an exemplary elastic decision boundaries used by the voltage control system.

Referring to FIG. 4, a process 400 is shown for determining a voltage adjustment decision by voltage adjustment decision processor circuit 128 using the processor and modules shown in FIG. 3. In the process, the selected voltage signal is received from the voltage signal processing element 200 (FIG. 2) in block 402. In block 404, a determination is made of the location of the voltage with respect to defined boundary decisions. A graph of exemplary voltage locations and their boundaries is shown in FIG. 5. The decision boundaries were preset based on characteristics of the electrical and electronic devices comprising the loads and confidence levels as discussed herein.

If a determination is made that the received selected voltage is below a lower boundary, an assert voltage increase is executed in block 406. When a voltage increase assertion is executed an increase indication signal is sent to voltage regulating transformer 106 via the regulator interface 110 to increase the tap setting, thereby increasing the delivered voltage.

If a determination is made that the received selected voltage is above the lower bound and below the lower deadband, an increment voltage increase integrator is executed in block 408. If a determination is made that the received selected voltage is above the lower deadband and below the setpoint, a decrement voltage increase integrator is executed in block 410.

If a determination is made that the received selected voltage is below the upper deadband and above the setpoint, a decrement voltage increase integrator is executed in block 412. If a determination is made that the received selected voltage is below the upper bound and above the upper dead band, an increment voltage decrease integrator is executed in block 414.

If a determination is made that the received selected voltage is about the upper bound, an assert voltage decrease is executed in block 416. When an assert voltage decrease is executed a decrease indication signal is sent to voltage regulator transformer via the regulator interface 110 to decrease the tap voltage.

After the assert voltage increase is executed in block 406, a confirm voltage increase is executed in block 420. After the assert voltage decrease is executed in block 416, a confirm voltage decrease is executed in block 422. After executing the confirm voltage increase in block 420 and confirm voltage decrease in block 422, a set all integrators to zero is executed in block 424.

After executing the increment voltage increase integrator in block 408 and the decrement voltage increase integrator in block 410, a set voltage decrease integrator to a zero is executed in block 426. After executing the decrement voltage decrease integrator in block 412 and the increment voltage decrease integrator in block 414, a set voltage increase integrator to a zero is executed in block 428.

After executing set voltage decrease integrator to zero is executed in block 426, a determination is made in block 440 whether the voltage increase integrator exceeds a predetermined limit. If the voltage increase integrator exceeds the predetermined limit, then a voltage increase is asserted in block 406 and confirmed in block 420. If the voltage increase integrator does not exceed the predetermined limit, then the process ends in block 450.

After executing set voltage increase integrator to zero is executed in block 428, a determination is made in block 432 whether the voltage decrease integrator exceeds a predetermined limit. If the voltage increase integrator exceeds the predetermined limit, then a voltage decrease is asserted in block 416 and confirmed in block 422. If the voltage decrease integrator does not exceed the predetermined limit, then the process ends in block 450.

Confirmation of a voltage increase or decrease may be implemented by detecting a step change in one or more voltage(s) measured by corresponding metering device(s) 118a-118n. An exemplary method for detection of such a step change involves computation of the statistical moments of a voltage time series segment which is expected to manifest a step change, and comparing those moments with those for an ideal step change such as the Heaviside step function. This method of moment matching is described, for example, in a different context by Tabatabai, A. J. and Mitchell, O. R., "Edge Location to Subpixel Values in Digital Imagery", IEEE Transactions on Pattern Analysis and Machine Intelligence Volume PAMI-6, No. 2, pp 188-210, 1984. The magnitude of the step change thus computed may then be compared to that expected by the change in the voltage regulator tap setting to confirm that the voltage change has occurred.

Once the voltages are confirmed in blocks 420 and 422 all integrators are set to zero in block 424 and the process ends in bock 450.

If the voltage decrease integrator does not exceed the predetermined limit, and after setting all integrators to zero in block 448, the process ends in block 450. After ending in block 450 the process may repeat again upon receiving the selected signal from the voltage processor in block 402.

Referring to FIG. 5, there is shown graph 500 illustrating exemplary elastic tap decision boundaries used by the process described in FIG. 4. On the x-axis of graph 500 are the salient voltages and on the y-axis is shown selected integral weights assigned to the voltage regions. A set point voltage 502 is indicated at the center voltage level, and a dead band 504 is assigned at equal voltage displacements from the set point voltage.

An upper bound 508 and lower bound 510 are outside the deadband and are defined based on the predetermined confidence level using the formulas described herein. The forward integration regions are defined as the region between the deadband and the upper bound, or between the deadband and the lower bound. The forward integral weights are applied in these regions. The reverse integration regions are defined as the regions between the dead band and the set point voltage 502.

Exemplary Tap Response to Voltage Changes on Curved Decision Boundaries

In one implementation when the received selected voltage signal from the voltage processor is at a selected minimum voltage at Point 'A', the nonlinear integral associated with a tap decrease decision will be incremented. If the received selected voltage signal remains within the indicated region, eventually a voltage tap decrease will be asserted. Similarly, when the selected minimum voltage appears at Point 'AA', the nonlinear integral associated with a tap increase decision will be incremented, eventually resulting in a voltage tap increase assertion.

On the other hand if when the received selected voltage signal from the voltage processor is at a selected minimum voltage at Point 'B', the nonlinear integral associated with a tap increase decision will be decremented and eventually nullifying the pending tap decision. Similarly, when the selected minimum voltage appears at Point 'BB', the nonlinear integral associated with a tap decrease decision will be decremented, eventually nullifying the pending tap decision.

Background for Dispersion and Variance

For a subject time series obtained by uniform sampling of a random process, comprising sample values:

$$x_k, 1 \le k \le n,$$

one may estimate the scale of the sampled time series as either the sample variance or the sample dispersion, depending on the properties of the random process from which the samples are obtained.

First, an estimate of the statistical location, often referred to as the average or mean, is required. For some non-gaussian random processes, the sample mean does not suffice for this purpose, motivating the use of the median or other robust measures of sample location. In the formulas that follow, we shall designate the location estimate as $\bar{x}$.

A class of non-gaussian random processes is characterized by heavy-tailed probability densities, which are often modeled for analytical purposes as alpha-stable distributions and are thus referred to as alpha-stable random processes. For an exemplary reference on the application of such distributions in signal processing, see: Nikias, C. L. and Shao, M., "Signal Processing with Alpha-Stable Distributions and Applications", John Wiley & Sons, 1995. For time series sampled from non-gaussian alpha-stable random processes, one may estimate the scale as the sample dispersion:

$$d = e^{\frac{1}{n}\sum_{k=1}^{n} ln|x_k - \bar{x}|},$$

for $$x_k \ne \bar{x}$$

For time series sampled from gaussian random processes, one may estimate the scale as the sample variance:

$$s = \frac{1}{n-1}\sum_{k=1}^{n}(x_k - \bar{x})^2$$

The choice of the location and scale estimates may be motivated by the properties of the subject random process, which can be determined, for example, by examination of estimates of the probability density of the random process.

Weighting Factors and Integrals Formulas for Use with a Voltage Control Processor The deviation voltage used in the decision boundary integrals is computed as the difference between the selected minimum voltage and the voltage setpoint:

$$\Delta v = v_{min} - v_{set}$$

The computation of the weighting factors requires that the parameters for the weighting functions be defined and available to the voltage controller processor. The following example will use the first-order sigmoid function as the nonlinear weighting function but many others may be applied to achieve different integrating behavior; for example, trigonometric functions, linear or trapezoidal functions, polynomial functions, spine fitting functions, or exponential functions of any order could serve here. In the following definitions, specific subscripts will be used to denote the region of application of the defined quantity.

subscript a shall indicate the region above the setpoint voltage $v_{set}$ subscript b shall indicate the region below the setpoint voltage $v_{set}$ subscript f shall indicate quantities used in the forward (incrementing) integrals subscript r shall indicate quantities used in the reverse (decrementing) integrals Thus, define $v_{af}$, $v_{bf}$ as the inflection points of the sigmoid functions for the weights for the upper (voltage decrease) and lower (voltage increase) forward integrals, respectively.

Similarly, define $v_{ar}$, $v_{br}$ as the inflection points of the sigmoid functions for the weights for the upper (voltage decrease) and lower (voltage increase) reverse integrals, respectively.

Define $2\Delta v_d$ as the magnitude of the voltage deadband, symmetrical around the voltage setpoint.

Assigning the quantity $\beta$ as the slope parameter for the first-order sigmoid and the quantity $\omega$ as the voltage corresponding to the location of the inflection point, we can define the nonlinear weighting functions for the four regions of interest:

$$\omega_{af} = [1 + e^{\beta_{af}(v_{af} - v_{min})}]^{-1}$$

$$\omega_{ar} = [1 + e^{\beta_{ar}(v_{min} - v_{ar})}]^{-1}$$

$$\omega_{bf} = [1 + e^{\beta_{bf}(v_{min} - v_{bf})}]^{-1}$$

$$\omega_{br} = [1 + e^{\beta_{br}(v_{br} - v_{min})}]^{-1}$$

The upper voltage adjustment decision integral may now be written as $$\Psi_a = \frac{1}{T_a}\int (\omega_{af}\Delta v \,|_{\Delta v > v_{set} + v_d} - \omega_{ar}\Delta V \,|_{\Delta v < v_{set} + v_d})dt$$

and the lower voltage adjustment decision integral as $$\Psi_b = -\frac{1}{T_b} \int (\omega_{bf} \Delta v \mid_{\Delta v < v_{set} - v_d} - \omega_{br} \Delta v \mid_{\Delta v > v_{set} - v_d}) dt$$

The voltage controller then asserts a voltage decrease signal (causing the voltage regulating transformer 106 to tap down) if either $$\Delta v > v_a - v_{set} \text{ or } \Psi_a > v_a - v_{set};$$

in either case, the controller further determines that the 'tap down' operation will not cause the voltage regulating transformer 106 to exceed the lowest tap position permitted by the regulator interface device.

Similarly, the voltage controller then asserts a voltage increase signal (causing the voltage regulating transformer 106 to tap up) if either $$\Delta v < v_b - v_{set} \text{ or } \Psi_b < v_b - v_{set};$$

in either case, the controller further determines that the 'tap up' operation will not cause the voltage regulating transformer 106 to exceed the highest tap position permitted by the regulator interface device.

Referring to FIG. 6, diagram 600 is shown having cumulative probability distribution curve 602 illustrating a typical probability distribution of the voltage control system that is used to select a weighting factor that is used in estimating voltage deviations. The x-axis corresponds to a unit random variable and the y-axis corresponds to a probability. In one implementation a "Tail Probability" 604 or (1−p) is computed using the formula "p=(1−a)/2", where "a" is the specified confidence level and "p" is the tail probability. A "Weighting Factor" 606 is the value of the unit random variable (also generally referred to as "normalized") as located on the Probability Distribution corresponding to the Tail Probability. Although a typical probability distribution is shown, the particular probability distribution that is applied may vary depending on the properties of the electrical load for the electrical or electronic devices.

From the foregoing, it is apparent the description provides systems, processes and apparatus which can be utilized to monitor and manage electrical power distribution. Further, the disclosed systems, processes and apparatus permit power conservation by maintaining delivered voltages near levels that optimize the efficiency of the connected electrical and electronic devices and also can provide more robust power delivery under inclement power system loading conditions. In addition, the systems, processes and apparatus of the present system are cost effective when compared with other power management devices. In contrast to prior art systems, the present systems, processes and apparatus provide infinite variability of system parameters, such as multiple, different delivered voltage levels, within predetermined limits. For example, all users can be incrementally adjusted up or down together, or some users may be adjusted to a first degree while other users are adjusted to another degree or to separate, differing degrees. Such advantageously provides new flexibility in power distribution control, in addition to providing new methods of adjustment.

Management of Multiple Regulated Power Sources

The examples above describe techniques for controlling an adjustable power source based on continuously detecting measurements of electrical power supplied to one or more electrical devices from the power source. Estimated deviant voltage levels that the supplied electricity will not drop below or exceed as a result of varying electrical consumption by the one or more electrical devices are continuously computed, e.g., using location and scale statistics for the detected time series of measurements. As will be understood by those skilled in the art, a location parameter gives information indication of the location of the probability distribution of a random variable. In some cases the location may be characterized as a central tendency for distribution, e.g., the mean, median, or mode of the distribution. As will be understood by those skilled in the art, a scale parameter gives information indication of the spread of the probability distribution or a random variable. Examples of scale parameters include, e.g., variance and standard deviation and dispersion.

The deviant voltage levels may be computed based on a predetermined confidence level and specific properties of the effects on measured voltage due to varying consumption computed from the detected measurements. A voltage level output of the electricity supplied to the electrical device may be adjusted based on the computed deviant voltage level, e.g., by changing the tap on a multiple tap regulating transformer. As detailed above, these techniques may provide a number of advantageous effects, e.g., reducing the number of tap changes required to provide a desired level of performance, thereby extending the operation lifetime of the regulated power sources.

Figure 7:
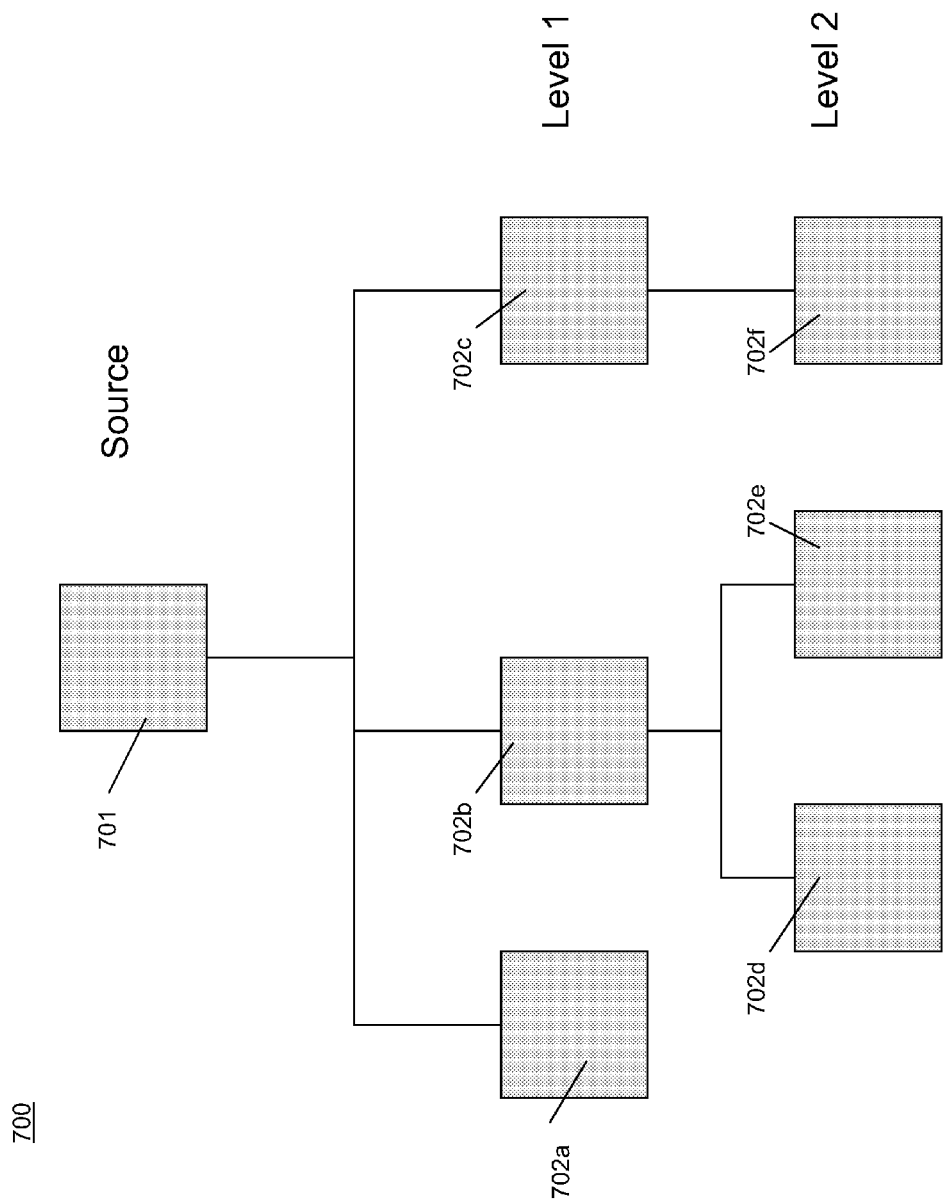
FIG. 7 is a schematic of a cascaded power supply system having a regulated power supply root node and plurality of regulated power supply nodes.
Figure 8:
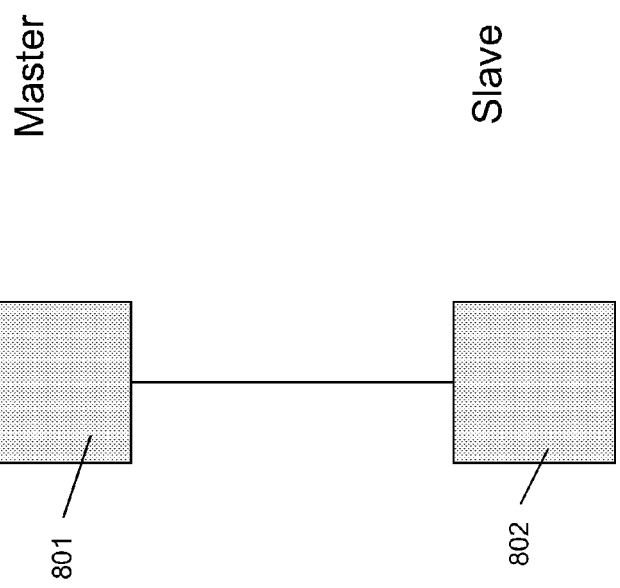
FIG. 8 is a schematic of a power supply system having a regulated power supply master node and a remote regulated power supply slave node.

In some embodiments, e.g., as shown in FIGS. 7 and 8 (described in greater detail below), a system for providing electrical power may include multiple regulated power sources (e.g., two or more multiple tap regulating transformers) in electrical communication. In some embodiments, any of the control techniques described above may be applied separately to each regulated power source. However, in some embodiments, this approach may fail to account for interactions between the regulated power sources. In some cases, this may result in disadvantageous effects, e.g., unnecessary tap changes that may decrease the operational lifetime of the regulated power sources.

For example, in various embodiments, the local control process for each node in the system may be substantially similar to those described above. That is, for each node, one or more monitoring devices may be used to continuously detect voltages supplied from the regulated power source to one or more electrical devices. These measurements may be processed, e.g., using the techniques described with reference to FIG. 2 above, e.g., to provide delay compensation. The processed signals may be used as an input to a control process for the regulated power source, e.g., similar to the type described with reference to FIG. 4 above. In various embodiments, this local control process will provide a local assertion for an adjustment to the regulated power source. For example, in the case where the source is a multiple tap regulated transformed, the control process may provide an assertion to increase, decrease, or maintain the tap setting.

In some embodiments, it may be desirable to modify the local assertion based on information related to the operation of other nodes in the system. For example, consider the case where a downstream node receives a local assertion to increase the tap in order to prevent the output voltage from dropping below a desired level. Meanwhile, an upstream node substantially simultaneously has also received a local assertion for a tap increase. The upstream tap increase will increase the voltage level at the downstream node, obviating the need for the tap increase at the downstream node. In such a case, it would be advantageous to allow the upstream node to tap up, while negating (i.e., cancelling) the tap increase assertion at the downstream node. This operation eliminates the redundant tap change at the downstream node, thereby reducing wear and tear on the downstream node.

The example above is just one instance where the operating state of one node in the system may inform the proper adjustment to be made at another node. In the various embodiments described here, techniques are provided that systematically adjust the local control of nodes to take into account the operational status of various other nodes in the system.

FIG. 7 shows a schematic illustration of a power supply system 700. The system 700 includes a root node regulated power supply 701 (e.g., located at a substation), and multiple remote node regulated power supplies 702a-702f. In general the system may have any suitable topology. Some embodiments may include cascades of nodes including the root node 701 and multiple remote nodes 702. For example, as shown, a cascade of nodes is formed by the root node 701, downstream remote note 702c, and further downstream node 702f. Similarly cascades are formed by the nodes 701, 702b and 702d and the nodes 701, 702b, and 702e.

The system 700 may also include remote nodes 702 that are not part of a cascade of nodes, but instead form a "master/slave" pair with the root node 701. As shown, remote node 702a is an example of a paired remote node.

The remote nodes may be grouped level, such that all of the remote nodes 702 in a given level have the same number of upstream nodes intermediate between the remote node 702 and the source node 701. For example, as shown, remote nodes 702a, 702b, and 702c each have zero upstream remote nodes, and so form Level 1. Remote nodes 702d, 702e, and 702f each have one upstream remote node, and so for Level 2. Although two levels are shown, in various embodiments fewer or more levels may be provided in a given system.

FIG. 8 shows a schematic illustration of a power supply system 800 including only a master node 801 and a slave node 802. For the sake of clarity, an exemplary control technique will be described first with respect to this simplified example. A generalization of this technique for use with more complicated systems (e.g., of the type shown in FIG. 7 will then be described).

Figure 9:
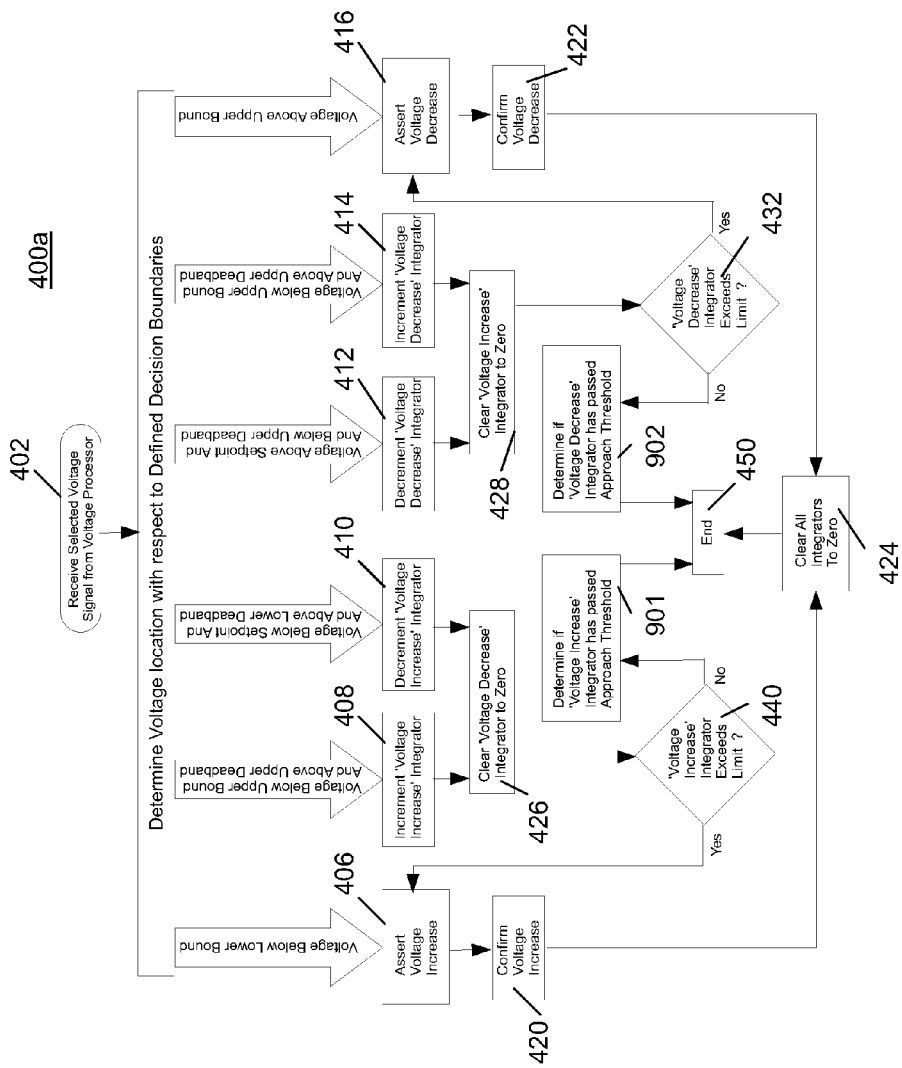
FIG. 9 is a flow chart of a process for determining a local voltage adjustment decision and decision approach information.

Each of the master and slave nodes undergo a local control process that is substantially similar to that described in the examples presented above with reference to FIGS. 1-6 above, with the following modification. Referring to FIG. 9 a local adjustment decision process flow 400a is shown that is nearly the same as that shown in FIG. 4. However, the flow has been modified to include two additional process steps 901 and 902.

As detailed above, when the selected monitored voltage signal for the node is below a lower bound, an output voltage increase is asserted. When the signal is above an upper bound, a voltage decrease is asserted. When the signal is in an intermediate state between the lower and upper bounds, an increase voltage or decrease voltage integrator is incremented or decrement depending on voltage location in the range (e.g., as detailed above with respect to steps 408, 410, 412 and 414). As in FIG. 4, if the increase voltage integrator exceeds a certain limit, a voltage increase is asserted (step 440) and, similarly, if the decrease voltage integrator exceeds a certain limit, a voltage decrease is asserted. (step 432). In various embodiments, integrators may calculate the accumulated nonlinear weighted time integral of a selected minimum estimated deviant voltage, as described in detail above, In the process shown in FIG. 4, if the neither of the integrators exceeding their respective limits, no further action was take. However, in the process shown in FIG. 9, if the increase integrator fails to exceed the limit, in step 901 the integrator is analyzed to determine if the integrator is approaching the limit. For example, as shown, the integrator can be compared to an approach threshold. In step 902 a similar analysis is conducted for the voltage decrease integrator.

In various embodiments, the analysis may provide information indicative of the approach to the voltage change based on any suitable metric including, without limitation: a difference between a selected estimated deviant voltage and at least one setpoint voltage; a rate of change of the difference between the a selected estimated deviant voltage an at least one setpoint voltage; a direction of change between the a selected estimated deviant voltage an at least one setpoint voltage.

For example, in one embodiment, the approach state may be identified based one two criteria. First, an approach state may be identified when the integrator exceeds a configurable threshold, referred to as an outer approach threshold. Second, an approach state may be identified when the integrator is increasing toward a given definite increase/decrease decision boundary and exceeds an inner approach threshold value different from the outer approach threshold. In various embodiments any suitable technique may be used to determine the integrator rate or direction of change, including, for example, pseudo-derivative techniques.

Figure 10:
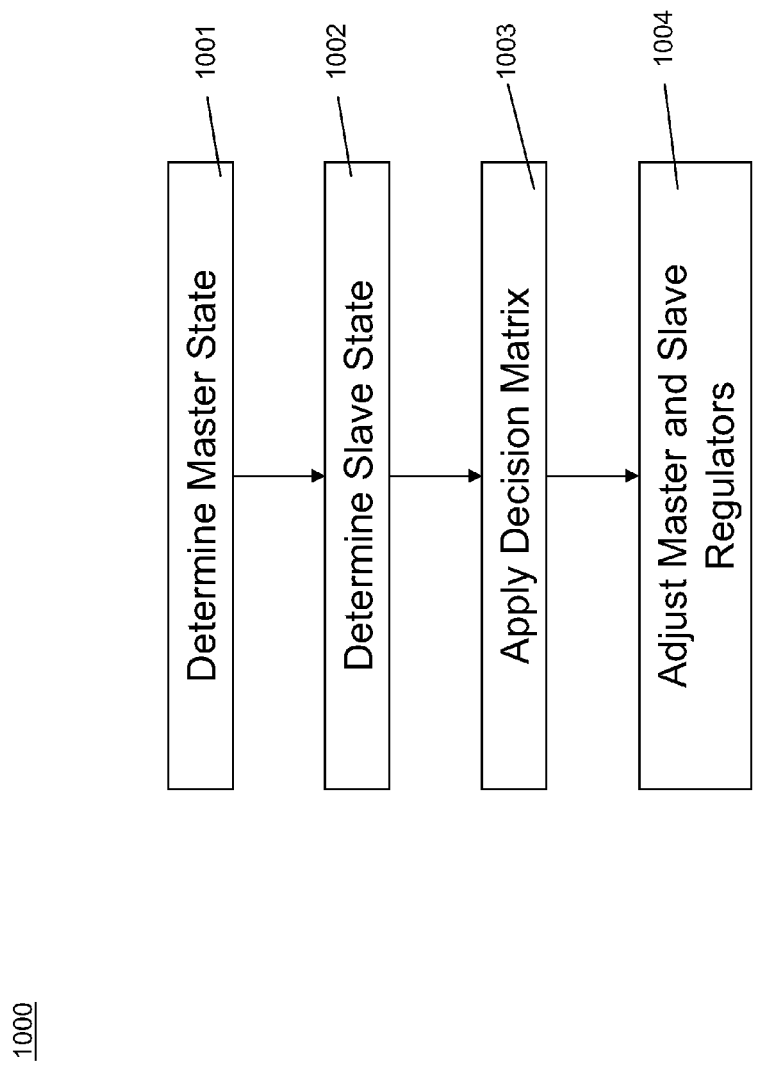
FIG. 10 is a flow chart of a process for managing regulation in a master-slave power supply system.

Accordingly, in some embodiments, for each of the master and slave nodes, the process 400a will output two types of information. The first type is definite adjustment information indicative of whether the local process control has asserted a voltage increase, a voltage decrease, or no change. The second is anticipated adjustment information that indicates, when no definite voltage change has been asserted, whether the voltage level is approaching a change boundary. FIG. 10 shows a process 1000 for modifying the local control assertions for the master and slave nodes based on a comparison of the local state of the two nodes. In steps 1001 and 1002, the state of each of the master and slave nodes is determined, e.g., based on the definite adjustment information and the anticipated adjustment information for each node. For example the local state of each node may be identified with one of the following states:

A. Definite Raise indicating a locally asserted tap increase;
B. Approach Raise indicating an approach to a locally asserted tap increase;
C. Bottom Dead Zone indicating a voltage level in a dead zone range corresponding to no tap increase, but a voltage level below a set point;
D. Top Dead Zone indicating a voltage level in a dead band range corresponding to no tap increase, but a voltage level above a set point;
E. Approach Lower indicating an approach to a locally asserted tap decrease; and
F. Definite Lower indicating a locally asserted tap decrease.

In step 1003, the actual control actions to be applied to the master and slave nodes are determined based on the local states of the node, and in step 1004, the master and slave regulators are adjusted based on the output from step 1003.

For example, in some embodiments of step 1003, a decision matrix, e.g., of the type shown in FIG. 11 may be used. Referring to FIG. 11, the matrix includes entries for each possible combination of master and slave node states. Each entry provides instructions for raising, lowering, or maintaining the voltage level for each of the master and slave nodes. Each entry also includes, as appropriate, instructions for clearing, maintaining, or modifying the increase voltage or decrease voltage integrator of process 400a for each node.

In the interest of brevity, only select entries in the decision matrix will be discussed. However, it will be apparent to one skilled in the art in view of the disclosure that, in each instance, the entry provides instructions that advantageously take into account the interaction between the master and slave node.

Consider, for example, the entry corresponding to master Definite Raise and slave Definite Raise. For this entry, a master raise is asserted, while the slave raise is negated, such that the slave voltage level is unchanged. This is advantageous because the raise in the master node would increase the downstream voltage level at the slave node, obviating the need for the slave raise. Thus, it is more efficient to simply raise the master while leaving the slave unchanged.

Similarly, consider the entry corresponding to master Approach Raise and slave Definite Raise. Again, a master raise is asserted, while the slave raise is negated, such that the slave voltage level is unchanged. This is advantageous because the impending raise in the master node would obviate the need for the slave raise. Thus, it is more efficient to simply raise the master while leaving the slave unchanged.

In contrast, consider the entries corresponding to master Bottom or Top Dead Zone and slave Definite Raise. In this case the slave raise is asserted, since there is no concurrent or impending master raise to obviate the need for the increase in the slave voltage.

In cases where neither the master nor slave nodes is in a definite change state, no change is asserted for either node, and the relevant running integrators (if any) are simply maintained.

In some embodiments, when the master node is the Definite Raise state, and the slave node is the Top Dead Zone state, the slave voltage decrease integrator may be modified or "pre-loaded" to take into account the fact that the downstream effect of the master raise is likely to push the slave from the dead zone toward the approach to the Definite Lower state.

Similarly, when the master node is the Definite Lower state, and the slave node is the Bottom Dead Zone state, the slave voltage increase integrator may be modified or "pre-loaded" to take into account the fact that the downstream effect of the master lower is likely to push the slave from the dead zone toward the approach to the Definite Raise state.

The process 1000 may be repeated to provide ongoing control of the system 800, thereby reducing unnecessary tap change to increase the operation lifetime of the system.

Figure 12:
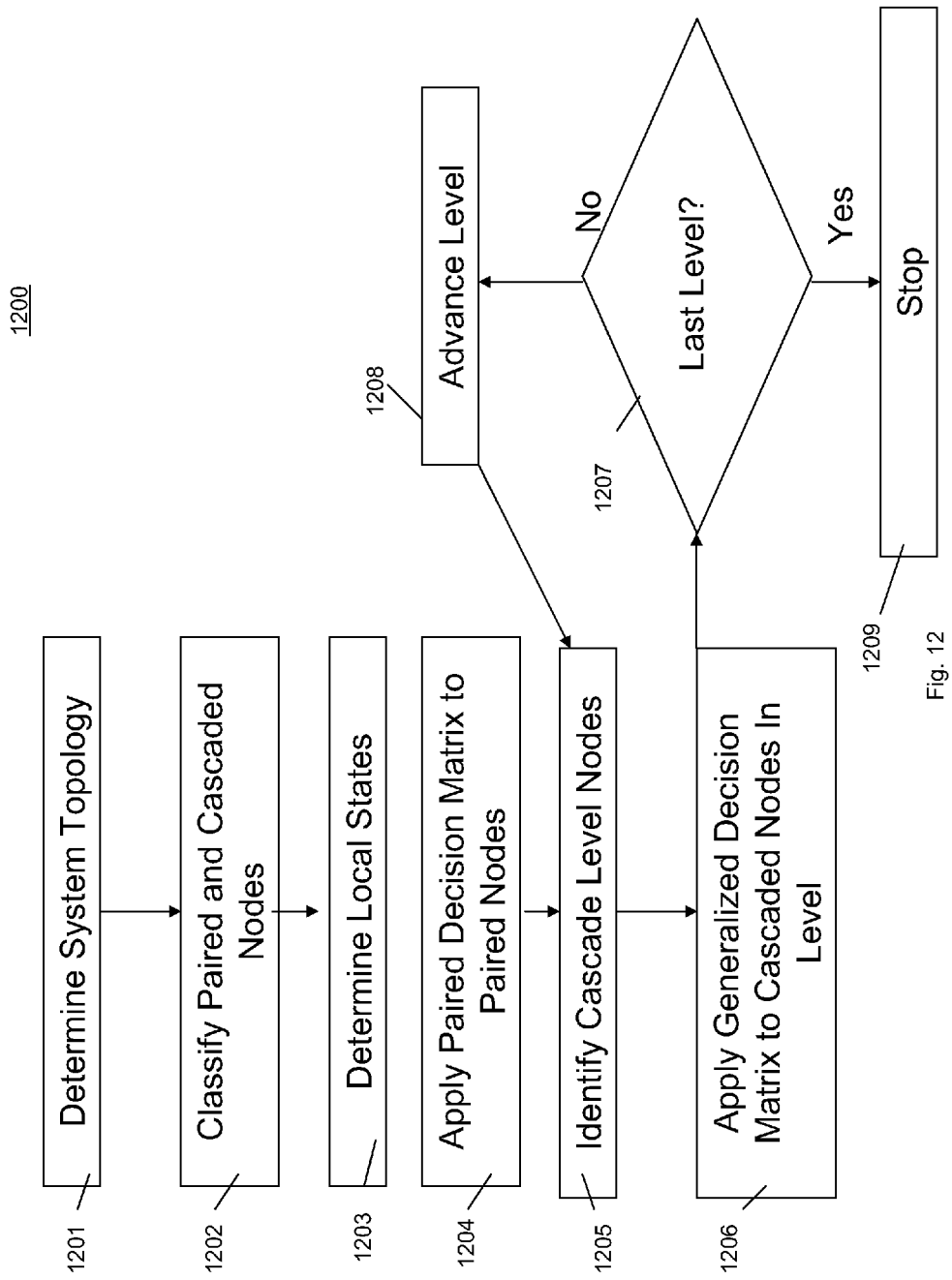
FIG. 12 is a flow chart of a process for managing regulation in a cascaded power supply system.

Referring to FIG. 12, in some embodiments, the process described above may be generalized to systems having a root node and more than one remote node, e.g., as shown in FIG. 7. In initial step 1201, the topology of the power supply system is determined. In some embodiments, this information may be provided a priori. However, in other embodiments, the topology may be automatically determined by sensing the switching state of elements within the system and combining this information with a priori information about the siting of the system elements.

In step 1202, the system topology is analyzed to classify each remote node as either belonging to a cascade of nodes (e.g., as shown in FIG. 7, nodes 702b-f) or as a node that is paired to the root node only (e.g., as shown in FIG. 7, node 702a).

In step 1203, the local state of each node is determined, e.g., using process 900 described above. The state of each of the root and remote nodes is determined, e.g., based on the respective definite adjustment information and the anticipated adjustment information for each node. For example the local state of each node may again be identified with one of the following states:

A. Definite Raise indicating a locally asserted tap increase;

B. Approach Raise indicating an approach to a locally asserted tap increase;

C. Bottom Dead Zone indicating a voltage level in a dead band range corresponding to no tap increase, but a voltage level below a set point;

D. Top Dead Zone indicating a voltage level in a dead band range corresponding to no tap increase, but a voltage level above the set point.

E. Approach Lower indicating an approach to a locally asserted tap decrease; and F. Definite Lower indicating a locally asserted tap decrease.

For paired remote nodes, a special control process may be applied in step 1203-4. For example, a specialized paired decision matrix, e.g., as shown in FIG. 11, may be applied, with the root node serving as the master node, and the remote node as the slave. The results of the application of the specialized paired decision matrix may be used to adjust the voltage level of the paired remote nodes.

The process 1200 then turns to the cascaded nodes. In step 1205, remote nodes at a first level (as defined above) are identified. In step 1205, a generalized decision matrix is applied to each node in this level (as will be described in detail below). The results of the application of the generalized decision matrix may be used to adjust the voltage level of the cascaded remote nodes.

In step 1207, it is determined if the current level is the highest level in the system. If yes, the process ends in step 1029. If not, the level is advanced in step 1208, and returns to step 1205 where the generalized decision matrix is applied to each node in the current level. This process is repeated to provide level by level application of the generalized decision matrix.

Figure 14:
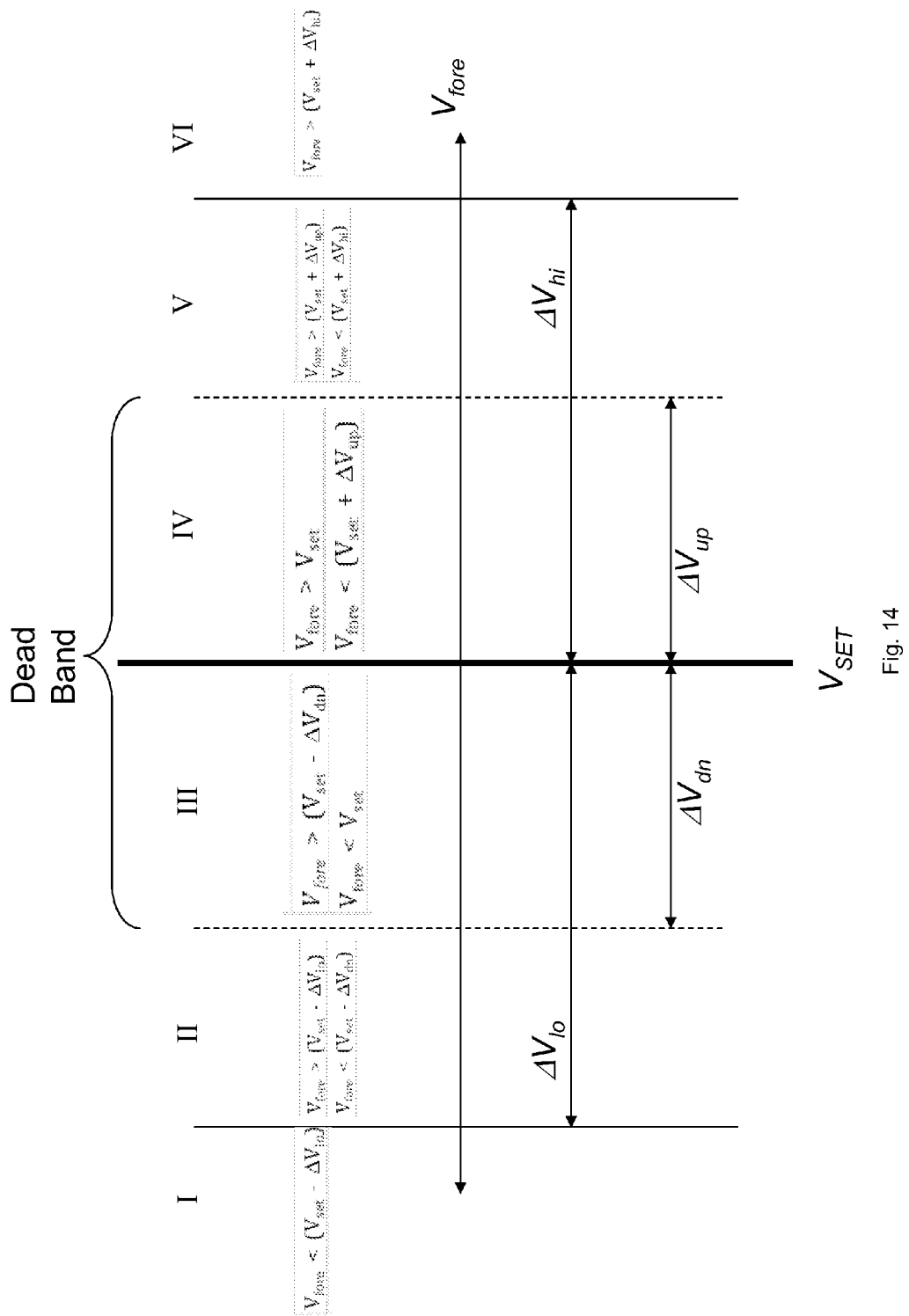
FIG. 14 is an illustration of a classification scheme for the net source effect at a remote node in a cascaded power supply system.

Referring to FIGS. 13 and 14, in some embodiments the generalized decision matrix is similar to that used for the master-slave case, but with some important differences. As in the master-slave case one input in to the matrix is the local state of the remote node. However, in the case of a cascade, the remote node will be influence by the state of all upstream nodes. Accordingly, the master slave state is replaced by a forecasted net source effect state. The net source effect forecast voltage $V_{fore}$ is equal to the voltage level for the remote node plus an offset $\Delta V_{src}$ corresponding to the expected offset provided by all upstream nodes.

The net source effect forecast voltage $V_{fore}$ may be classified by comparing its value to a selected set point voltage $V_{SET}$ using the scheme illustrated in FIG. 14. As shown, $V_{fore}$ may be identified with one of the following classes:

I. $V_{fore}$ lower than the low boundary voltage $V_{SET}-\Delta V_{lo}$;

II. $V_{fore}$ higher than the low boundary voltage $V_{SET}-\Delta V_{lo}$ and lower than $V_{SET}-\Delta V_{dn}$, $\Delta V_{dn}$ corresponding to a tap decrease for the node;

III. $V_{fore}$ higher than the set point voltage $V_{SET}-\Delta V_{dn}$, and lower than $V_{SET}$;

IV. $V_{fore}$ higher than $V_{SET}$ and lower that $V_{SET}+\Delta V_{up}$, $\Delta V_{up}$ corresponding to a tap decrease for the node;

V. $V_{fore}$ higher than $V_{SET}+\Delta V_{up}$ and lower than a high boundary voltage $V_{SET}+\Delta V_{hi}$; and IV. $V_{fore}$ higher than a high boundary voltage $V_{SET}+\Delta V_{hi}$.

In step 1206, the actual control actions to be applied to the remote node are determined based on the local state of the remote node and the source effect forecast voltage state, The remote node regulator may be adjusted based on the output the generalize decision matrix.

Referring to FIG. 13, the generalized decision matrix includes entries for each possible combination of local remote node state and net source effect forecast voltage state.

Each entry provides instructions for raising, lowering, or maintaining the voltage level for the remote node. Each entry may also include, as appropriate, instructions for clearing or maintaining the local state of the remote node as a definite change or approach change state. Each entry may include instructions for clearing, maintaining, or modifying the increase voltage or decrease voltage integrator of process 400a for each node. Finally, if a voltage adjustment is asserted, the matrix entry may include instructions for incrementing or decrementing the load voltage offset at the remote node. The load voltage offset may then be used to determine the source voltage offset when applying the generalized matrix to downstream remote nodes.

In the interest of brevity, only select entries in the generalized decision matrix will be discussed. However, it will be apparent to one skilled in the art in view of the disclosure that, in each instance, the entry provides instructions that advantageously takes into account the interaction between the local and upstream nodes.

Consider, for example, the entry corresponding to a local state of Definite Raise and a net source effect forecast voltage $V_{fore}$ in intermediate state III, such that $V_{fore}$ is higher than $V_{SET}-\Delta_{dn}$, and lower than $V_{SET}$. For this entry, the remote node voltage level raise is negated, such that the remote node voltage level is unchanged. This is advantageous because, taking into account the influence of upstream nodes, the net source effect forecast voltage is less than $\Delta V_{dn}$ below the desired set point, such that no local voltage raise is required. By avoiding the unnecessary tap change, the operation life of the remote node regulator may be increased. Further, the definite and approach raise states are cleared, while the increase voltage integrator is maintained.

Similarly, consider, for example, the entry corresponding to a local state of Definite Raise and a net source effect forecast voltage $V_{fore}$ in raise state V where $V_{fore}$ is higher than $V_{SET}+\Delta V_{up}$ and lower $V_{SET}+\Delta V_{hi}$. Again the asserted raise is negated, since now $V_{fore}$ is higher than $V_{SET}$ and so no local voltage increase is necessary. However, in contrast to the previous example, because $V_{fore}$ is now well above $V_{SET}$, the voltage increase integrator is cleared.

In some embodiments, when $V_{fore}$ is in the highest state VI, and the local state is in one of the Dead Zone states, the local remote node voltage decrease integrator may be modified or "pre-loaded" to take into account the fact that the upstream source effects are likely to push the local node from the Dead Zone toward the approach to the Definite Lower state.

Similarly, when $V_{fore}$ is in the lowest state I, and the local state is in one of the Dead Zone states, the local remote node voltage increase integrator may be modified or "pre-loaded" to take into account the fact that the upstream effects are likely to push the local node from the Dead Zone toward the approach to the Definite Raise state.

The process 1200 may be repeated to provide ongoing management of the system 700, thereby reducing unnecessary tap change to increase the operation lifetime of the system.

Appendix B includes an exemplary algorithm outline code for implementing the process 1200.

Figure 15:
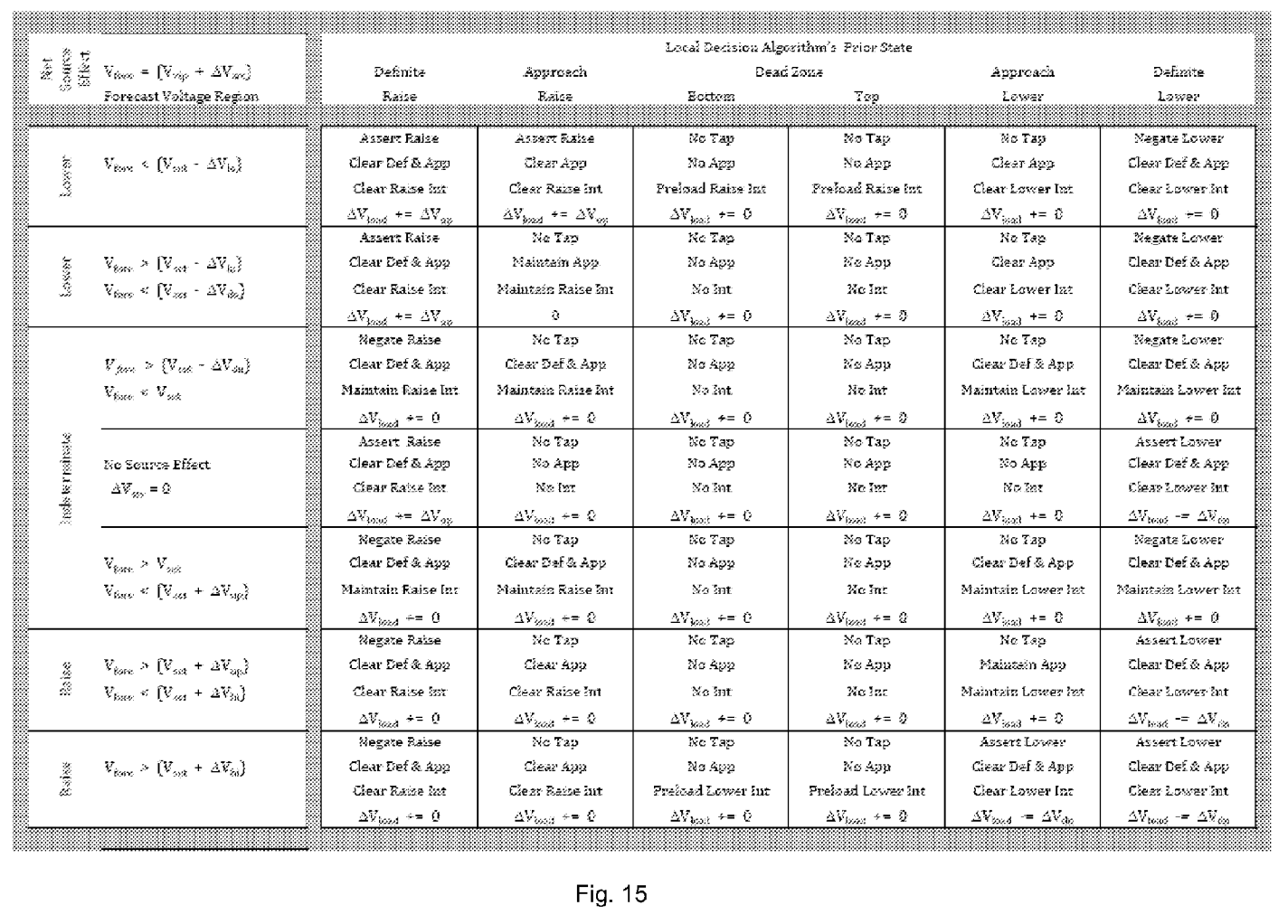

In various embodiments other suitable forms of decision matrix may be used. For example, FIG. 15 shows a decision matrix similar to that set forth in FIG. 13, however, the matrix takes into account an additional net source effect forecast voltage $V_{fore}$ classification where the source offset $\Delta V_{src}$ is equal to, or substantially equal to zero. When $V_{fore}$ is in this state, a tap raise or tap lower is asserted only if the local state is Definite Raise or Definite Lower, respectively. For all other local states (Approach Raise, Bottom Dead Zone, Top Dead Zone, and Approach Lower), there is no tap change, no approach state is set, and no voltage increase integrator is applied.

FIG. 16 shows an exemplary system for controlling a power supply system (e.g., as shown in FIGS. 7 and 8) by implementing the techniques described above with reference to FIGS. 7-15. A processor 1601 is operatively coupled to a data communication system 1602. The data communication system may be used to receive signals from monitoring devices (not shown) that may, e.g., continuously detect measurements and continuous voltage signals of electricity supplied to one or more electrical devices powered. The communication system 1602 may also provide telemetry control for the remote regulated power supply nodes in the system.

For example, in various embodiments, communication system 1602 may include a wired network, a wireless network; a satellite based communication system; a wireless mesh network; an internet; a cellular network; a data through power line network, an optical fiber network, or any combination thereof.

In some embodiments the processor 1601 and/or at least a portion of the communication system 1602 may be collocated with a master or root node of the system, e.g., at a substation. In other embodiments, the processor 1601 and/or at least a portion of the communication system 1602 maybe located remotely from all of the nodes in the power supply system. For example in some embodiments, a single central processor may be configured to control multiple power control systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit (s) may be used to execute the instructions. The communication interface(s) may be coupled to a wired or wireless network, bus, or other communication means and may therefore allow the computer to transmit communications to and/or receive communications from other devices. The display unit (s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

APPENDIX A

| Client Ref. | Country | Matter Type | Status | Matter Title | Application No. | Application Date | Publication No. | Publication Date | Pat./Reg. No. |
|---|---|---|---|---|---|---|---|---|---|
| | United States of America | Patents | Pending | ELECTRIC POWER CONTROL SYSTEM AND EFFICIENCY OPTIMIZATION PROCESS FOR A POLYPHASE SYNCHRONOUS MACHINE | 12/540,366 | Aug. 13, 2009 | 2010-0085004 | Apr. 8, 2010 | |
| | United States of America | Patents | Pending | ELECTRIC POWER CONTROL SYSTEM AND PROCESS | 12/540,364 | Aug. 13, 2009 | 2010-0090674 | Apr. 15, 2010 | |
| | United States of America | Patents | Pending | MESH DELIVERY SYSTEM | 13/369,794 | Feb. 9, 2012 | | | |
| | United States of America | Patents | Inactive | MESH DELIVERY SYSTEM | 61/441,224 | Feb. 9, 2011 | | | |
| | P.C.T. | Patents | Pending | MESH DELIVERY SYSTEM | PCT/US2012/024519 | Feb. 9, 2012 | WO2012/109465 | Aug. 16, 2012 | |
| | United States of America | Patents | Pending | SYSTEM AND METHOD FOR ESTIMATING PERFORMANCE METRICS OF CONSERVATION VOLTAGE REDUCTION (CVR) SYSTEMS AND VOLT/VAR OPTIMIZATION SYSTEMS | 61/605,609 | Mar. 1, 2012 | | | |
| | United States of America | Patents | Granted | ELECTRICAL POWER DISTRIBUTION CONTROL SYSTEMS AND PROCESSES | 11/397,091 | Apr. 4, 2006 | 2006-0195229 | Aug. 31, 2006 | 7,729,810 |
| | Canada | Patents | Pending | ELECTRICAL POWER DISTRIBUTION CONTROL SYSTEMS AND PROCESSES | 2,649,838 | Apr. 6, 2006 | | | |
| | United States of America | Patents | Pending | AUGMENTED MESH DELIVERY SYSTEM | 61/680,960 | Aug. 8, 2012 | | | |

What is claimed is:

1. A method of controlling operation of a system for providing electrical power to one or more electrical devices, the system comprising an adjustable power source root node and one or more adjustable power source remote nodes located remotely from the adjustable power source root node, the method comprising:

for each of the adjustable power source root node and the one or more adjustable power source remote nodes:
continuously detecting, by an electronic metering device, measurements of electricity supplied to the one or more electrical devices from a power source associated with the adjustable power source root node or the one or more adjustable power source remote nodes;
continuously computing, by a processor of a controller, estimated deviant voltage levels that the supplied electricity will not drop below or exceed as a result of varying electrical consumption by the one or more electrical devices, the deviant voltage level being computed based on a predetermined confidence level and the detected measurements of electricity;

outputting, by the controller, definite adjustment information indicative of an adjustment to or maintenance of a voltage level output of the electricity supplied to the one or more electrical devices based on the computed estimated deviant voltage levels;

outputting, by the controller, anticipated adjustment information indicative of an anticipated adjustment to the voltage level output based on the computed deviant voltage levels; and applying, by the controller, a first decision function for at least one of the one or more adjustable power source remote nodes to generate node control information for controlling the voltage level output of the at least one of the one or more adjustable power source remote nodes based on:

the definite adjustment information,
the anticipated adjustment information, and
source information indicative of a voltage offset applied by one or more nodes upstream of the at least one of the one or more adjustable power source remote nodes; and controlling, by the controller, the voltage level output of the at least one of the one or more adjustable power source remote nodes based on the node control information.

2. The method of claim 1, comprising:
continuously computing the estimated deviant voltage based at least in part on information indicative of at least one of a location statistic and a scale statistic of the detected measurements.

3. The method of claim 1, comprising:
continuously computing the estimated deviant voltage based at least in part on information indicative of both a location statistic and a scale statistic of the detected measurements.

4. The method of claim 2, wherein the location statistic comprises information indicative of a central tendency.

5. The method of claim 2, wherein the scale statistic comprises information indicative of a variance or a standard deviation or a dispersion.

6. The method of claim 1, wherein the system comprises one or more cascades of source nodes each cascade comprising an adjustable power source root node and at least two adjustable power source remote nodes, and further comprising:

grouping nodes in a plurality of cascade level groups, the plurality of cascade level groups being indicative of a number of remote nodes upstream of each node in a level of the plurality of cascade level groups;

applying a first decision matrix to each of the nodes in a first cascade level having no upstream remote nodes; and successively applying the first decision matrix on a level by level basis to each of the nodes in one or more additional cascade level groups.

7. The method of claim 6, wherein the system comprises at least one paired remote node that is not part of a cascade; wherein the method comprises:

identifying the at least one paired remote node;
applying a paired decision function different than the first decision function to generate source control information for controlling the voltage level output of the at least one paired node based on:

the definite adjustment information for the paired node,
the anticipated adjustment information for the paired node,
the definite adjustment information for a master node; and
the anticipated adjustment information for a master node.

8. The method of claim 1, wherein each of the adjustable power source root node and the one or more adjustable power source remote nodes is connected to a respective regulator having multiple tap settings with each tap setting supplying electricity with a different voltage level, and wherein adjusting the voltage level output of the electricity supplied to the one or more electrical devices based on the computed deviant voltage level comprises:

detecting a tap setting and a regulator load voltage of one or more taps of the regulator;

asserting a decrease in one of the one or more taps of the regulator responsive to at least one of: (1) a selected estimated deviant voltage exceeding a predetermined voltage level derived from a setpoint voltage, or (2) an accumulated nonlinear weighted time integral of the selected minimum estimated deviant voltage exceeding the predetermined voltage level;

asserting an increase in one of the one or more taps of the regulator responsive to at least one of: (1) a selected estimated deviant voltage falling below a predetermined voltage level derived from a setpoint voltage, or (2) an accumulated nonlinear weighted time integral of a selected minimum estimated deviant voltage falling below the predetermined voltage level; and otherwise maintaining a current level in the one or more taps of the regulator.

9. The method of claim 8, wherein, for each remote node:
the definite adjustment information is indicative of an asserted increase, asserted decrease, or an asserted maintenance of current the regulator multiple tap setting; and wherein the anticipated adjustment information is based on the estimated deviant voltage or the accumulated nonlinear weighted time integral of a selected minimum estimated deviant voltage.

10. The method of claim 9, wherein the anticipated adjustment information is based on at least one selected from a list consisting of:

a difference between the selected estimated deviant voltage and at least one setpoint voltage;

a rate of change of the difference between the selected estimated deviant voltage and the at least one setpoint voltage; and a direction of change between the selected estimated deviant voltage and the at least one setpoint voltage.

11. The method of claim 10, wherein applying the first decision function to each remote node comprises:

determining a source effect voltage forecast based on the voltage level output by the remote node and a voltage offset applied by the one or more nodes upstream of the remote node;

determining a source effect voltage forecast classification by comparing the forecast to a setpoint voltage, a low boundary voltage lower than the set point voltage, and a high boundary voltage higher than the set point voltage.

12. The method of claim 11, comprising identifying the source effect voltage forecast with at least one of the following forecast states:

a first forecast state corresponding to a forecast lower than the low boundary voltage $V_{lo}$;

a second forecast state corresponding to a forecast higher than the low boundary voltage $V_{lo}$ and lower than the set point voltage $V_{SET}$ minus a voltage offset $\Delta V_{dn}$, corresponding to a tap decrease;

a third forecast state corresponding to a forecast higher than the set point voltage $V_{SET}$ minus the voltage offset $\Delta V_{dn}$, and lower than the setpoint $V_{SET}$;

a fourth forecast state corresponding to a forecast higher than the set point voltage $V_{SET}$ and lower than the set point voltage $V_{SET}$ plus a voltage offset $\Delta V_{up}$ corresponding to a tap increase;

a fifth forecast state corresponding to a forecast higher than the set point voltage $V_{SET}$ plus the voltage offset $\Delta V_{up}$ and lower than the high boundary voltage $V_{hi}$; and a sixth forecast state corresponding to a forecast higher than the high boundary voltage $V_{hi}$.

13. The method of claim 11, comprising determining a local prior state classification for the remote node based on the definite adjustment information and the anticipated adjustment information.

14. The method of claim 13, comprising identifying the local prior state with at least one of the following local states:
   a first local state indicating a locally asserted tap increase;
   a second local state indicating an approach to a locally asserted tap increase;
   a third local state indicating a voltage level in a dead band range corresponding to no tap increase;
   a fourth local state indicating an approach to a locally asserted tap decrease; and
   a fifth local state indicating a locally asserted tap increase.

15. The method of claim 13, comprising asserting or negating a locally asserted tap increase based on the local prior state classification and the source effect voltage forecast classification.

16. The method of claim 13, comprising asserting or negating a locally asserted tap decrease based on the local prior state classification and the source effect voltage forecast classification.

17. The method of claim 14, wherein applying the first decision function further comprises:
   asserting a tap increase if:
      the source effect voltage forecast is in the first forecast state and the local prior state is in the first or second local state; or
      the source effect voltage forecast is in the second forecast state and the local prior state is in the first local state.

18. The method of claim 14, wherein applying the first decision function further comprises:
   negating the locally asserted tap increase if:
      the source effect voltage forecast is in the third, fourth, fifth, or sixth forecast state and the local prior state is in the first local state.

19. The method of claim 14, wherein applying the first decision function further comprises:
   asserting a tap decrease if:
      the source effect voltage forecast is in the sixth forecast state and the local prior state is in the fourth or fifth local state; or
      the source effect voltage forecast is in the fifth forecast state and the local prior state is in the fifth local state.

20. The method of claim 14, wherein applying the first decision function further comprises:
   negating the locally asserted tap decrease if:
      the source effect voltage forecast is in the first second, third, or fourth forecast state and the local prior state is in the fifth local state.

21. The method of claim 13, further comprising clearing or maintaining at least one accumulated nonlinear weighted time integral of a selected minimum estimated deviant voltage based on the local prior state classification and the source effect voltage forecast classification.

22. The method of claim 13, further comprising, if the local state is classified as a third local state indicating a voltage level in a dead band range corresponding to no tap increase:
   determining if the voltage level is above or below a setpoint within the dead band; and
   based on the determination and the forecast state classification, adjusting at least one accumulated nonlinear weighted time integral of a selected minimum estimated deviant voltage for the remote node.

23. The method of claim 1 further comprising receiving information indicative of a topology of nodes in the system for providing electrical power.

24. The method of claim 1 further comprising determining information indicative of a topology of nodes in the system for providing electrical power based on detected information indicative of a state of one or more switching devices in the system.

25. The method of claim 1, wherein, for each of the adjustable power source root node and the one or more adjustable power source remote nodes, continuously computing of the estimated deviant voltage level that the supplied electricity will not drop below or exceed as a result of the electrical consumption by the electrical device and the detected measurements comprises:
   simultaneously processing a voltage time series of the supplied electricity along multiple paths comprising:
      filtering the voltage time series to derive a filtered voltage time series;
      estimating a smooth delay compensated zero-mean dispersion of the voltage time series; and
      producing a delay compensated smoothed negative peak envelope of the voltage time series.

26. The method of claim 1, wherein the continuous computing of the estimated deviant voltage levels that the supplied electricity will not drop below or exceed as a result of the electrical consumption by the one or more electrical devices comprises at least one of:
   (i) estimating a low-pass spectral behavior of one or more observed voltage time series of the electricity supplied to the one or more electrical devices, with a spectral cutoff frequency consistent with a voltage adjustment decision period;
   (ii) estimating a dispersion or variance of each observed voltage time series;
   (iii) estimating a first-order envelope of the minimum values of each observed voltage time series;
   (iv) applying weighting factors to the estimated dispersions consistent with configured confidence specifications thereby estimating a voltage deviation that will not be exceeded with the specified confidence;
   (v) computing a forecast minimum for each observed voltage time series by combining the results of (i), (iii), and (iv) and selecting a forecast minimum voltage from these results;
   (vi) comparing the selected forecast minimum voltage against a pre-specified voltage bound;
   (vii) incrementing a nonlinear weighted time integral for the selected forecast minimum voltage if the forecast minimum voltage is more than one regulator tap step voltage below the target but greater than a lower voltage bound; and (viii) decrementing a nonlinear weighted time integral if the selected forecast minimum voltage approaches the target voltage closer than one regulator tap step voltage.

27. The method of claim 1, wherein the continuous computing of the estimated deviant voltage levels that the supplied electricity will not drop below or exceed as a result of the electrical consumption by the one or more electrical devices comprises at least one of:
(i) estimating a low-pass spectral behavior of one or more observed voltage time series of the electricity supplied to the one or more electrical devices, with a spectral cutoff frequency consistent with a voltage adjustment decision period;
(ii) estimating a dispersion or variance of each observed voltage time series;
(iii) estimating a first-order envelope of the minimum values of each observed voltage time series;
(iv) applying weighting factors to the estimated dispersions consistent with configured confidence specifications thereby estimating a voltage deviation that will not be exceeded with the specified confidence;
(v) computing a forecast minimum for each observed voltage time series by combining the results of (i), (iii), and (iv) and selecting a forecast minimum voltage from these results;
(vi) comparing the selected forecast minimum voltage against a pre-specified voltage bound;
(vii) incrementing a nonlinear weighted time integral for the selected forecast minimum voltage if the forecast minimum voltage is more than one regulator tap step voltage above the target but less than an upper voltage bound; and
(viii) decrementing a nonlinear weighted time integral if the selected forecast minimum voltage approaches the target voltage closer than one regulator tap step voltage.

28. The method of claim 1, further comprising controlling a voltage adjustment at one or more of the remote nodes using on or more telemetry systems.

29. The method of claim 28, wherein the telemetry system comprises at least one selected from the list consisting of: a wired network, a wireless network, a satellite based communication system; a wireless mesh network; an internet; a cellular network; a data through power line network, an optical fiber network, and combinations thereof.

30. A non-transitory computer readable storage medium comprising instructions which when executed by a processor controls operation of a system for providing electrical power to one or more electrical devices, the system comprising an adjustable power source root node and one or more adjustable power source remote nodes located remotely from the adjustable power source root node, the instructions comprising instructions to:
for each of the adjustable power source root node and the one or more adjustable power source remote nodes:
continuously detect measurements of electricity supplied to the one or more electrical devices from a power source associated with the adjustable power source root node;
continuously compute estimated deviant voltage levels that the supplied electricity will not drop below or exceed as a result of varying electrical consumption by the one or more electrical devices, the deviant voltage level being computed based on a predetermined confidence level and the detected measurements of electricity;
output definite adjustment information indicative of an adjustment to or maintenance of a voltage level output of the electricity supplied to the one or more electrical devices based on the computed deviant voltage level;
output anticipated adjustment information indicative of an anticipated adjustment to the voltage level based on the computed deviant voltage levels; and
apply a first decision function for at least one of the one or more adjustable power source remote nodes to generate node control information for controlling the voltage level output of the at least one of the one or more adjustable power source remote nodes based on:
the definite adjustment information,
the anticipated adjustment information, and
source information indicative of a voltage offset applied by one or more nodes upstream of the at least one of the one or more adjustable power source remote nodes;
control the voltage level output of the at least one of the one or more adjustable power source remote nodes based on the node control information.

31. A system for controlling the operation of power supply system for providing electrical power to one or more electrical devices, the system comprising an adjustable power source root node and one or more adjustable power source remote nodes located remotely from the adjustable power source root node, the system comprising:
at least one electronic metering device;
a controller comprising a processor configured to:
for each of the adjustable power source root node and the one or more adjustable power source remote nodes:
continuously detect, via the at least one electronic metering device, measurements of electricity supplied to the one or more electrical devices from a power source associated with the adjustable power source root node;
continuously compute estimated deviant voltage levels that the supplied electricity will not drop below or exceed as a result of varying electrical consumption by the one or more electrical devices, the deviant voltage level being computed based on a predetermined confidence level and the detected measurements of electricity;
output definite adjustment information indicative of an adjustment to or maintenance of a voltage level output of the electricity supplied to the one or more electrical devices based on the computed deviant voltage level;
output anticipated adjustment information indicative of an anticipated adjustment to the voltage level based on the computed deviant voltage levels; and
apply a first decision function for at least one of the one or more adjustable power source remote nodes to generate node control information for controlling the voltage level output of the at least one of the one or more adjustable power source remote nodes based on:
the definite adjustment information,
the anticipated adjustment information, and
source information indicative of a voltage offset applied by one or more nodes upstream of the at least one of the one or more adjustable power source remote nodes;
control the voltage level output of the at least one of the one or more adjustable power source remote nodes based on the node control information.

32. The system of claim 31, further comprising at least one telemetry system operatively connecting the processor to the one or more of adjustable power source remote nodes.

33. The system of claim 31, further comprising: a plurality of sensors configured to measure information indicative of a voltage output by each node in the system.

34. The system of claim 33, wherein the plurality of sensors are operatively connected to the processor using a data communication apparatus.

35. A method of controlling the operation of a system for providing electrical power to one or more electrical devices, the system comprising a master node with a first adjustable power source and a slave node with a second adjustable power source located remotely from the master node, the method comprising:
for each of the master node and the slave node:
continuously detecting, by a sensor, measurements of electricity supplied to the one or more electrical devices from a power source associated with the master node or the slave node;
continuously computing, by a controller comprising a processor, estimated deviant voltage levels that the supplied electricity will not drop below or exceed as a result of varying electrical consumption by the one or more electrical devices, the deviant voltage level being computed based on a predetermined confidence level and the detected measurements of electricity;
outputting definite adjustment information indicative of an adjustment to or maintenance of a voltage level output of the electricity supplied to the one or more electrical devices based on the computed deviant voltage levels;
outputting anticipated adjustment information indicative of an anticipated adjustment to the voltage level based on the computed deviant voltage levels; and
applying a paired decision function to generate node control information for controlling the voltage level output of the master node and the slave node node based on:
the definite adjustment information for the slave node,
the anticipated adjustment information for the slave node, and
the definite adjustment information for the master node,
the anticipated adjustment information for the master node, and
controlling the voltage level output of the master node and the slave node based on the node control information.

36. The method of claim 35, wherein the system comprises only a single slave node coupled to the maser node.

37. The method of claim 35, wherein each of the master node and the slave node is connected to a respective regulator having multiple tap settings with each tap setting supplying electricity with a different voltage level, and wherein adjusting the voltage level output of the electricity supplied to the one or more electrical devices based on the computed deviant voltage level comprises:
detecting a tap setting and a regulator load voltage of one or more taps of the regulating transformer;
locally asserting a decrease in one of the regulator multiple tap settings if either a selected estimated deviant voltage exceeds a predetermined voltage level derived from a setpoint voltage or an accumulated nonlinear weighted time integral of the a selected minimum estimated deviant voltage exceeds the predetermined voltage level;
locally asserting an increase in one of the regulator multiple tap settings if either a selected estimated deviant voltage fall below a predetermined voltage level derived from a setpoint voltage, or an accumulated nonlinear weighted time integral of a selected minimum estimated deviant voltage falls below the predetermined voltage level; and
otherwise locally asserting a maintenance of current the regulator multiple tap setting.

38. The method of claim 37, wherein, for each of the master node and the slave node:
the definite adjustment information is indicative of an asserted increase, asserted decrease, or an asserted maintenance of current the regulator multiple tap setting; and
the anticipated adjustment information is based on the estimated deviant voltage or the accumulated nonlinear weighted time integral of a selected minimum estimated deviant voltage.

39. The method of claim 38, wherein the anticipated adjustment information for each of the master node and the slave node is based on at least one selected from the list consisting of:
a difference between the a selected estimated deviant voltage and at least one setpoint voltage;
a rate of change of the difference between the a selected estimated deviant voltage an at least one setpoint voltage;
a direction of change between the a selected estimated deviant voltage an at least one setpoint voltage.

40. The method of claim 39, wherein applying the paired decision function to each slave node comprises determining a master node local prior state classification for the master node based on the definite adjustment information and the anticipated adjustment information.

41. The method of claim 40, comprising identifying master node local prior state classification for the master node with at least one of the following forecast states:
a first local state indicating a locally asserted tap increase;
a second local state indicating an approach to a locally asserted tap increase;
a third local state indicating a voltage level in a dead band range corresponding to no tap increase;
a fourth local state indicating an approach to a locally asserted tap decrease; and
a fifth local state indicating a locally asserted tap increase.

42. The method of claim 39, comprising determining a slave node local prior state classification for the slave node based on the definite adjustment information and the anticipated adjustment information.

43. The method of claim 42, comprising identifying the slave node local prior state classification with at least one of the following local states:
a first local state indicating a locally asserted tap increase;
a second local state indicating an approach to a locally asserted tap increase;
a third local state indicating a voltage level in a dead band range corresponding to no tap increase;
a fourth local state indicating an approach to a locally asserted tap decrease; and
a fifth local state indicating a locally asserted tap increase.

44. The method of claim 42, comprising asserting or negating a locally asserted master node or slave node tap increase based on the master node and slave node local prior state classifications.

45. The method of claim 42, comprising asserting or negating a locally asserted master node or slave node tap decrease based on the master node and slave node local prior state classifications.

46. The method of claim 42, further comprising adjusting at least one accumulated nonlinear weighted time integral of a selected minimum estimated deviant voltage based on the master node an slave node local prior states.

47. The method of claim 42, further comprising, if the local state is classified as a third local state indicating a voltage level in a dead band range corresponding to no tap increase:
   determining if the slave node voltage level is above or below a setpoint within the dead band; and
   based on the determination and the master local prior state classification, adjusting at least one accumulated non-linear weighted time integral of a selected minimum estimated deviant voltage for the slave node.

48. The method of claim 36 further comprising receiving information indicative of a topology of nodes in the system for providing electrical power.

49. The method of claim 36, further comprising determining information indicative of a topology of nodes in the system for providing electrical power based on detected information indicative of a state of one or more switching devices in the system.

50. The method of claim 36, wherein, for each node, continuously computing of the estimated deviant voltage level that the supplied electricity will not drop below or exceed as a result of the electrical consumption by the electrical device and the detected measurements comprises:
   simultaneously processing a voltage time series of the supplied electricity along multiple paths comprising:
      filtering the voltage time series to derive a filtered voltage time series;
      estimating a smooth delay compensated zero-mean dispersion of the voltage time series; and
      producing a delay compensated smoothed negative peak envelope of the voltage time series.

51. The method of claim 36, wherein the continuously computing of the estimated deviant voltage levels that the supplied electricity will not drop below or exceed as a result of the electrical consumption by the one or more electrical devices comprises at least one of:
   (i) estimating a low-pass spectral behavior of one or more observed voltage time series of the electricity supplied to the one or more electrical devices, with a spectral cutoff frequency consistent with a voltage adjustment decision period;
   (ii) estimating a dispersion or variance of each observed voltage level;
   (iii) estimating a first-order envelope of the minimum values of each observed voltage level;
   (iv) applying weighting factors to the estimated dispersions consistent with configured confidence specifications thereby estimating a voltage deviation that will not be exceeded with the specified confidence;
   (v) computing a forecast minimum for each observed voltage by combining the results of (i), (iii), and (iv) and selecting a forecast minimum voltage from these results;
   (vi) comparing the selected forecast minimum voltage against a pre-specified voltage bound;
   (vii) incrementing a nonlinear weighted time integral for the selected forecast minimum voltage if the forecast minimum voltage is less than one regulator tap step voltage below the target but greater than a lower voltage bound; and
   (viii) decrementing a nonlinear weighted time integral if the selected forecast minimum voltage approaches the target voltage closer than one regulator tap step voltage.

52. The method of claim 36, further comprising controlling a voltage adjustment at the slave node using one or more telemetry systems.

53. The method of claim 52, wherein the one or more telemetry systems comprise at least one selected from a list consisting of: a wired network, a wireless network, a satellite based communication system; a wireless mesh network; an internet; a cellular network; a data through power line network, an optical fiber network, and combinations thereof.

54. A non-transitory computer readable storage medium comprising instructions which when executed by a processor controls the operation of a system for providing electrical power to one or more electrical devices, the system comprising a master node with a first adjustable power source and a slave node with a second adjustable power source located remotely from the master node, the instructions comprising instructions to:
   for each of the master node and the slave node:
      continuously detect measurements of electricity supplied to the one or more electrical devices from a power source associated with the master node or the slave node;
      continuously compute estimated deviant voltage levels that the supplied electricity will not drop below or exceed as a result of varying electrical consumption by the one or more electrical devices, the deviant voltage level being computed based on a predetermined confidence level and the detected measurements;
      output definite adjustment information indicative of an adjustment to or maintenance of a voltage level output of the electricity supplied to the electrical device based on the computed deviant voltage levels;
      output anticipated adjustment information indicative of an anticipated adjustment to the voltage level based on the computed deviant voltage levels; and
   apply a paired decision function to generate node control information for controlling the voltage level output of the master node and the slave node based on:
      the definite adjustment information for the slave node,
      the anticipated adjustment information for the slave node, and
      the definite adjustment information for the master node,
      the anticipated adjustment information for the master node, and
   control the voltage level output of the master and slave nodes based on the node control information.

55. A system for controlling the operation of power supply system for providing electrical power to one or more electrical devices, the system comprising a root node with a first adjustable power source and a slave node with a second adjustable power source located remotely from the root node, the system comprising:
   a controller comprising a processor configured to
      for each of the master node and the slave node:
         continuously detect measurements of electricity supplied to the one or more electrical devices from a power source associated with the master node or the slave node;
         continuously compute estimated deviant voltage levels that the supplied electricity will not drop below or exceed as a result of varying electrical consumption by the one or more electrical devices, the deviant voltage levels being computed based on a predetermined confidence level and the detected measurements;
         output definite adjustment information indicative of an adjustment to or maintenance of a voltage level output of the electricity supplied to the one or more electrical devices based on the computed deviant voltage levels;

output anticipated adjustment information indicative of an anticipated adjustment to the voltage level based on the computed deviant voltage levels; and apply a paired decision function to generate node control information for controlling the voltage level output of the master node and the slave node node based on:
  the definite adjustment information for the slave node,
  the anticipated adjustment information for the slave node, and
  the definite adjustment information for the master node,
  the anticipated adjustment information for the master node, and control the voltage level output of the master node and the slave node based on the node control information.

56. The system of claim 55, further comprising at least one telemetry system operatively connecting the processor to the slave node.

57. The system of claim 56, wherein the at least one telemetry system comprises at least one selected from a list consisting of: a wired network, a wireless network, a satellite based communication system; a wireless mesh network; an internet; a cellular network; a data through power line network, an optical fiber network, and combinations thereof.

58. The system of claim 55, further comprising: a plurality of sensors configured to measure information indicative of a voltage output by each node in the system.

59. The system of claim 58, wherein the plurality of sensors are operatively connected to the processor using a data communication apparatus.

60. The system of claim 59, wherein the data communication apparatus comprises at least one selected from a list consisting of wherein the telemetry system comprises at least one selected from the list consisting of: a wired network, a wireless network, a satellite based communication system; a wireless mesh network; an internet; a cellular network; a data through power line network, an optical fiber network, and combinations thereof.

61. The system of claim 55, wherein the slave node is substantially the only adjustable power source in the system located remote from the master node.

62. The system of claim 32, wherein the at least one telemetry system comprises at least one selected from the list consisting of: a wired network, a wireless network, a satellite based communication system; a wireless mesh network; an internet; a cellular network; a data through power line network, an optical fiber network, and combinations thereof.

* * * * *